US012760657B2

(12) United States Patent
Skara et al.

(10) Patent No.: US 12,760,657 B2
(45) Date of Patent: Oct. 13, 2026

(54) NOZZLE FOR PARTITIONED VOLUTE

(71) Applicant: Garrett Transportation I Inc., Torrance, CA (US)

(72) Inventors: Petr Skara, Brno-Turany (CZ); Juraj Pospisil, Brno-Turany (CZ); Pavel Foucek, Brno-Turany (CZ); Martin Babak, Brno-Turany (CZ); Michal Planka, Brno-Turany (CZ); Martin Sevcik, Brno-Turany (CZ); Michele Cardone, Brno-Turany (CZ); Aurelien Tingaud, Brno-Turany (CZ); Ondrej Senekl, Brno-Turany (CZ)

(73) Assignee: GARRETT TRANSPORTATION I INC., Tornce, CA (US)

( * ) Notice: Subject to any disclaimer, the term of this patent is extended or adjusted under 35 U.S.C. 154(b) by 0 days.

(21) Appl. No.: 19/104,222

(22) PCT Filed: Aug. 18, 2023

(86) PCT No.: PCT/US2023/072495

§ 371 (c)(1),
(2) Date: Feb. 16, 2025

(87) PCT Pub. No.: WO2024/044514

PCT Pub. Date: Feb. 29, 2024

(65) Prior Publication Data

US 2026/0055712 A1 Feb. 26, 2026

Related U.S. Application Data

(60) Provisional application No. 63/399,667, filed on Aug. 20, 2022.

(51) Int. Cl.

| | |
|---|---|
| ***F01D 17/16*** | (2006.01) |
| ***F01D 25/24*** | (2006.01) |
| *F02B 37/22* | (2006.01) |

(52) U.S. Cl.

CPC ............. *F01D 17/16* (2013.01); *F01D 25/24* (2013.01); *F02B 37/22* (2013.01); *F05D 2220/40* (2013.01)

(58) Field of Classification Search

CPC ........ F01D 17/16; F01D 17/165; F01D 25/24; F02B 37/22; F05D 2220/32

See application file for complete search history.

(56) References Cited

U.S. PATENT DOCUMENTS 9,016,060 B2 * 4/2015 Sauerstein ............ F01D 17/165 415/206
10,227,889 B2 * 3/2019 Arnold ...................... F02C 6/12

(Continued)

FOREIGN PATENT DOCUMENTS

JP 2007309140 A 11/2007
WO WO-2017048568 A1 * 3/2017 ............ F01D 9/041

OTHER PUBLICATIONS

Machine English Language Translation of JP2007309140(A).
International Preliminary Report on Patentability for PCT/US2023/072495, dated Mar. 6, 2025.

*Primary Examiner* — Eldon T Brockman
(74) *Attorney, Agent, or Firm* — BelayIP

(57) ABSTRACT

The disclosed assembly includes an exhaust gas turbine housing having inner and outer walls defining first and second exhaust gas channels to a turbine wheel space where an inner wall includes an inner wall end and an outer wall includes an outer wall end, both at the turbine wheel space. A first flow body is disposed adjacent to the inner wall end. A second flow body is disposed adjacent to the outer wall end. At least one set of adjustable variable geometry nozzle vanes define nozzle throats that direct flow of exhaust gas from at least one of the exhaust gas channels to the turbine wheel space At least one of the first flow body and the (Continued)

second flow body includes a concave trailing surface defined in part by an extension of an airfoil surface.

12 Claims, 34 Drawing Sheets

(56) References Cited

U.S. PATENT DOCUMENTS

| | | | | |
|---|---|---|---|---|
| 11,530,618 | B2 * | 12/2022 | Jaeger | F01D 9/026 |
| 11,668,201 | B2 * | 6/2023 | Biswas | F01D 9/045 415/208.2 |
| 12,012,861 | B2 * | 6/2024 | Karstadt | F01D 9/041 |
| 2005/0220616 | A1 | 10/2005 | Vogiatzis et al. | |
| 2015/0361802 | A1 | 12/2015 | Yoshida et al. | |
| 2016/0230585 | A1 * | 8/2016 | Arnold | F02B 37/025 |
| 2016/0281594 | A1 | 9/2016 | Poltoratski et al. | |
| 2018/0266268 | A1 * | 9/2018 | Karstadt | F01D 17/165 |
| 2022/0268169 | A1 * | 8/2022 | Jaeger | F02B 37/24 |
| 2024/0337199 | A1 * | 10/2024 | Karstadt | F01D 9/026 |

* cited by examiner

21100

NOZZLE FOR PARTITIONED VOLUTE

CROSS REFERENCE TO RELATED APPLICATIONS

This application is a national stage application of PCT/US2023/072495 which claims priority to and the benefit of a U.S. Provisional Application having Ser. No. 63/399,667, filed 20 Aug. 2022, which is incorporated by reference herein. This application incorporates by reference herein a U.S. Provisional Application having Ser. No. 63/151,755, filed 21 Feb. 2021 and incorporates by reference herein a U.S. Non-Provisional application having Ser. No. 17/556,758, filed 20 Dec. 2021 (issued as U.S. Pat. No. 11,530,618 B2 on 20 Dec. 2022), which claims priority to and the benefit of the U.S. Provisional Application having Ser. No. 63/151,755, filed 21 Feb. 2021, the content of all of the aforementioned is incorporated herein by reference.

BACKGROUND OF THE INVENTION

Field of the Invention

Subject matter disclosed herein relates generally to turbochargers.

Description of Related Art

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

BRIEF SUMMARY OF THE INVENTION

Further advantages, features, and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, without departing from the scope of the disclosure. A more complete understanding of the various methods, devices, assemblies, systems, arrangements, etc., described herein, and equivalents thereof, may be had by reference to the following detailed description when taken in conjunction with examples shown in the accompanying drawings where:

DETAILED DESCRIPTION OF THE INVENTION

Figure 1:
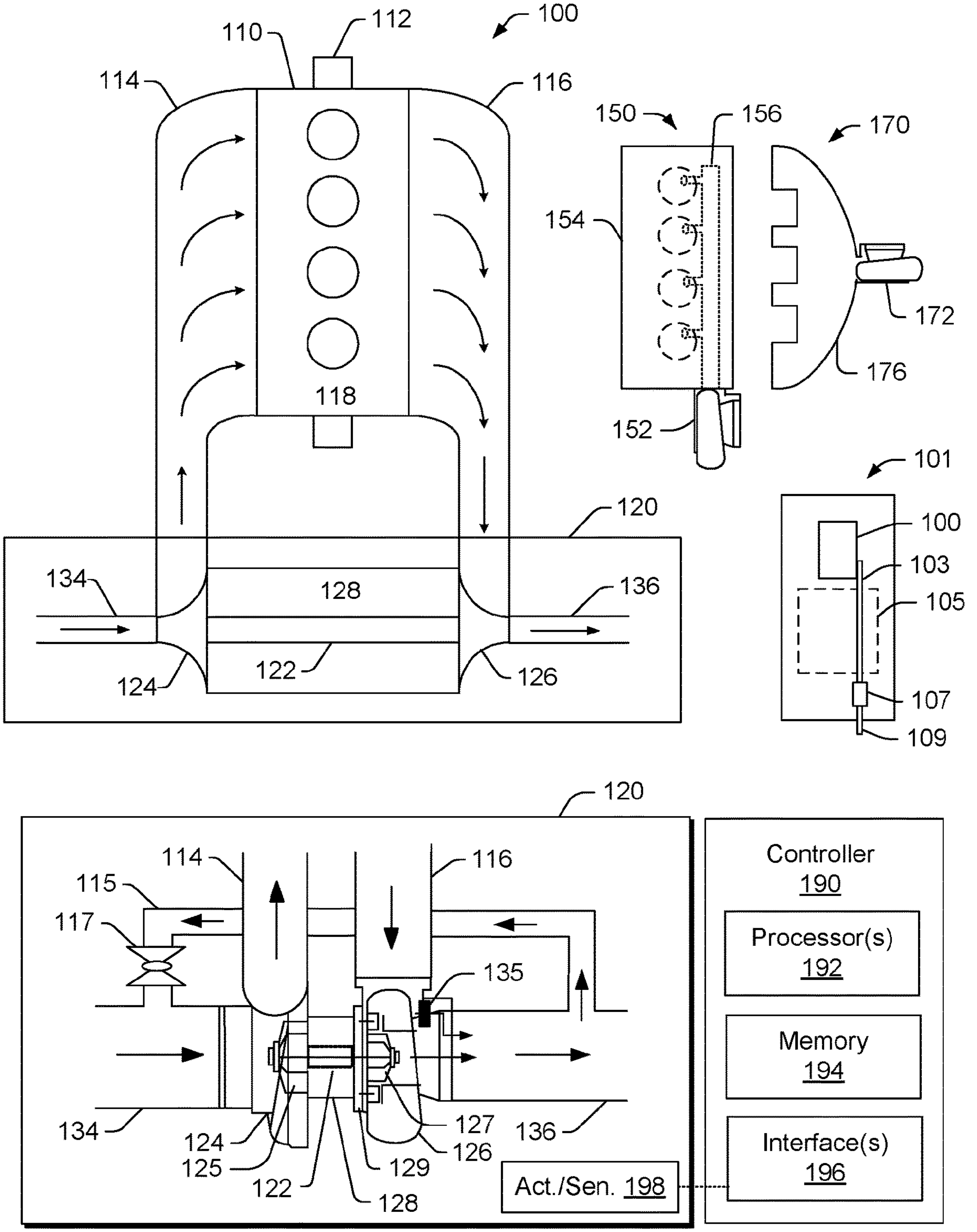
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system

100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

An internal combustion engine such as the engine 110 of FIG. 1 may generate exhaust gas with pulsating flow. In so-called constant-pressure turbocharging (e.g., Stauaufladung or accumulator charging), an exhaust gas manifold of sufficiently large volume may act to damp out mass flow and pressure pulses such that flow of exhaust gas to a turbine is relatively steady. Another approach, referred to as pulse turbocharging (e.g., Stoßsaufladung or surge charging), may aim to utilize kinetic energy of exhaust gas as it exits cylinder exhaust ports. For example, relatively short, small-cross section conduits may connect each exhaust port to a turbine so that much of the kinetic energy associated with the exhaust blowdown can be utilized. As an example, suitable groupings of different cylinder exhaust ports may organize exhaust gas pulses such that they are sequential, for example, with minimal overlap. In such a manner, exhaust gas flow unsteadiness may be held to an acceptable level. As an example, decisions as to implementation of constant-pressure or pulse turbocharging may depend on one or more factors such as, for example, power demands, efficiency demands, fuel type, number of cylinders, cylinder/stroke volume, engine size, etc.

Figure 2A:
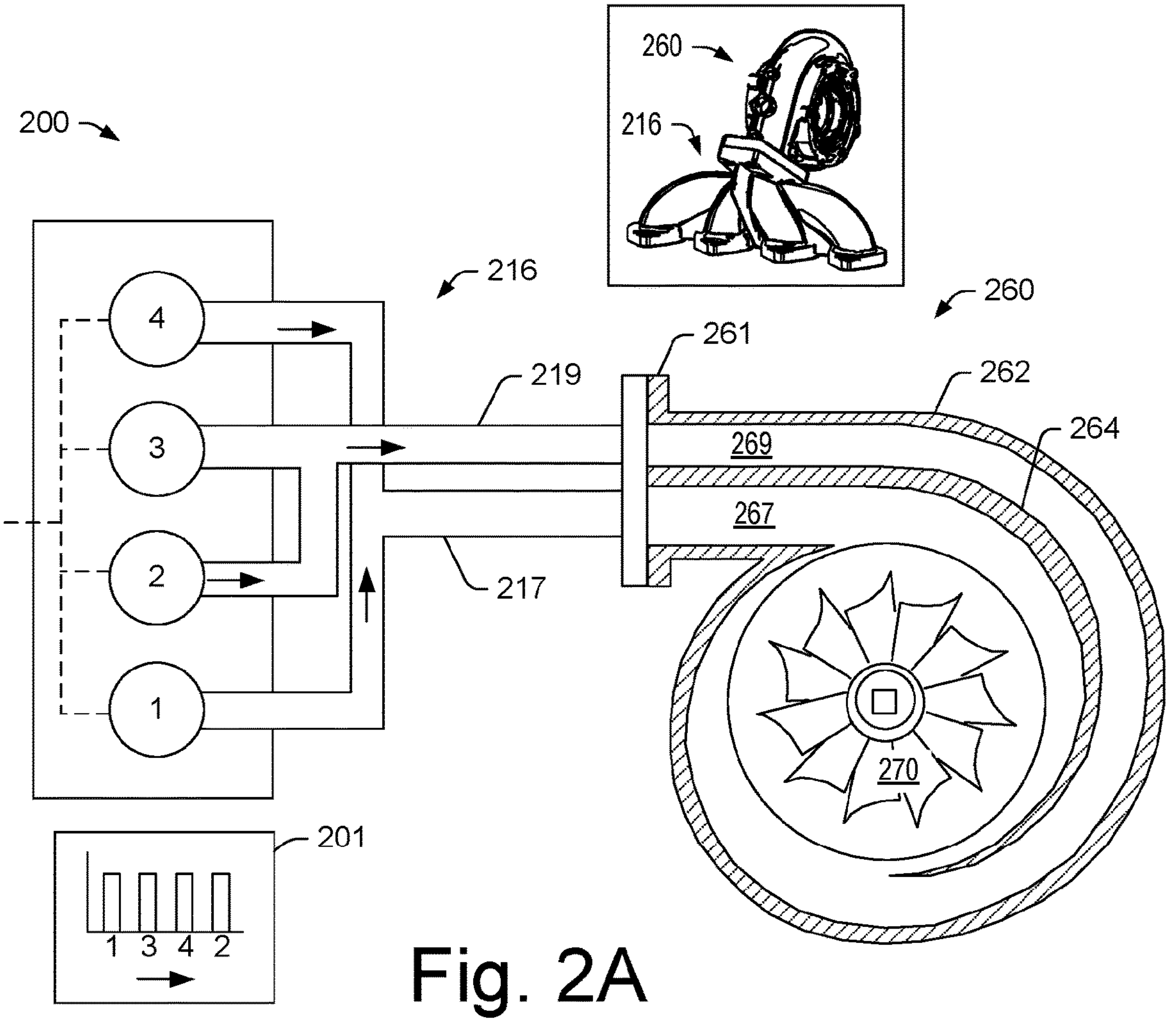
FIGS. 2A, 2B and 2C are views of examples of turbocharger related equipment.

FIG. 2A shows an example of a system 200 that includes a four cylinder internal combustion engine with a firing order 201, for example, consider a firing order 1-3-4-2. As shown, a manifold 216 (e.g., or manifolds) may define exhaust gas flow paths that can direct exhaust gas from the cylinders of the internal combustion engine to a turbine assembly 260, which can, at least in part, house a turbine wheel 270. As shown in FIG. 2A, the turbine assembly 260 includes a flange 261, an outer wall 262 and an inner wall 264 where the outer wall 262 and the inner wall 264 define exhaust volute flow paths 267 and 269. The path 267 may receive exhaust from a flow path 217 in communication with cylinders 1 and 4 and the path 269 may receive exhaust from a flow path 219 in communication with cylinders 2 and 3.

Figure 2B:
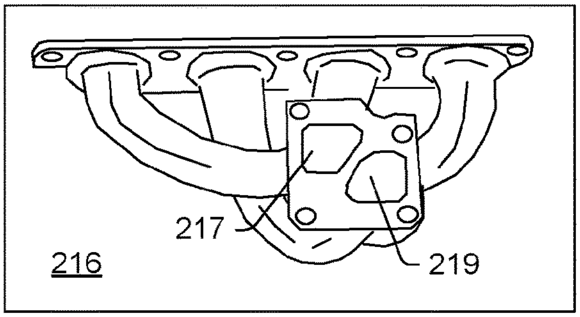

FIG. 2B shows an example of the manifold 216 as including the two flow paths 217 and 219. As an example, the manifold 216 may be considered a divided manifold that separates flow of exhaust from cylinders whose cycles may interfere with one another (e.g., as to exhaust pulse energy). For example, on a four-cylinder engine with firing order 1-3-4-2, cylinder #1 is ending its expansion stroke and opening its exhaust valve while cylinder #2 still has its exhaust valve open (cylinder #2 is in its overlap period). In an undivided exhaust manifold, a pressure pulse from cylinder #1's exhaust blowdown event may be more likely to contaminate cylinder #2 with high pressure exhaust gas, which can impact performance of cylinder #2's (e.g., ability to breathe properly) and diminish pulse energy that may have been better utilized in by a turbine. As an example, a proper grouping for the aforementioned engine may keep complementary cylinders grouped together (e.g., exhaust of cylinders #1 and #4 as one complementary group and cylinders #2 and #3 as another complementary group). Such an approach may better utilize exhaust pulse energy and, for example, improve turbine performance (e.g., increase boost more rapidly).

Figure 2C:
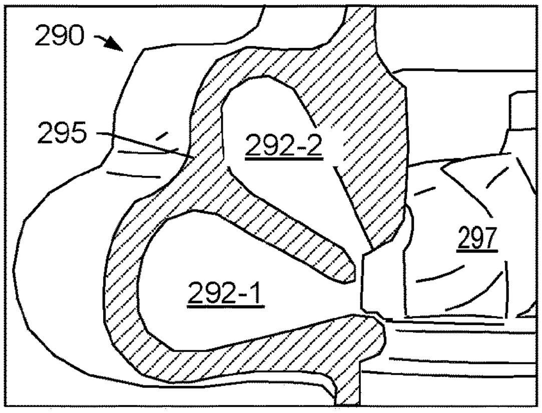

Referring to FIG. 2C, a turbine assembly 290 is shown that includes volutes 292-1 and 292-2 with a divider wall 295 along with a turbine wheel 297. The turbine assembly 290 differs from the turbine assembly 260 in that the volutes 292-1 and 292-2 span a common range of angles about the turbine wheel 297.

In FIG. 2A, the walls 262 and 264 may be walls of a double-channel turbine housing where the paths 267 and 269 are radially adjacently formed channels. As shown, the paths 267 and 269 run in a substantially spiral form with respect to the turbine wheel 270.

As shown, the paths 267 and 269 are of different lengths on account of their geometric arrangement and may accordingly have different gas volumes, for example, with the length of the path 269 being greater than that of the path 267.

While an internal combustion engine with four cylinders is illustrated in FIG. 2A, one or more other engine types and/or numbers of cylinders (for example in-line six cylinder engines, V8 engines, V6 engines, six-cylinder boxer engines) may be employed.

In FIG. 2A, the path 217 may be defined by a first manifold exhaust-gas path length and the path 219 may be defined by a second manifold exhaust-gas path length. In the example of FIG. 2A, the first manifold exhaust-gas path 217 has a length that is longer than that of the second exhaust-gas path 219.

As shown in FIG. 2A, the first manifold path 217 is in communication with the first path 267 while the second manifold path 219 is in communication with the second path 269 such that the longer exhaust-gas path length can be connected to the shorter path of the turbine assembly. Such an approach may aim to "equalize" overall path lengths. As an example, a double-channel (e.g., dual path) turbine housing with considerably different channels may be "equalized" via a manifold geometry with likewise different channels. As an example, a combination of short and long individual paths (e.g., channels) of a turbine housing and manifold may act to obtain approximately equal overall paths.

Figure 3:
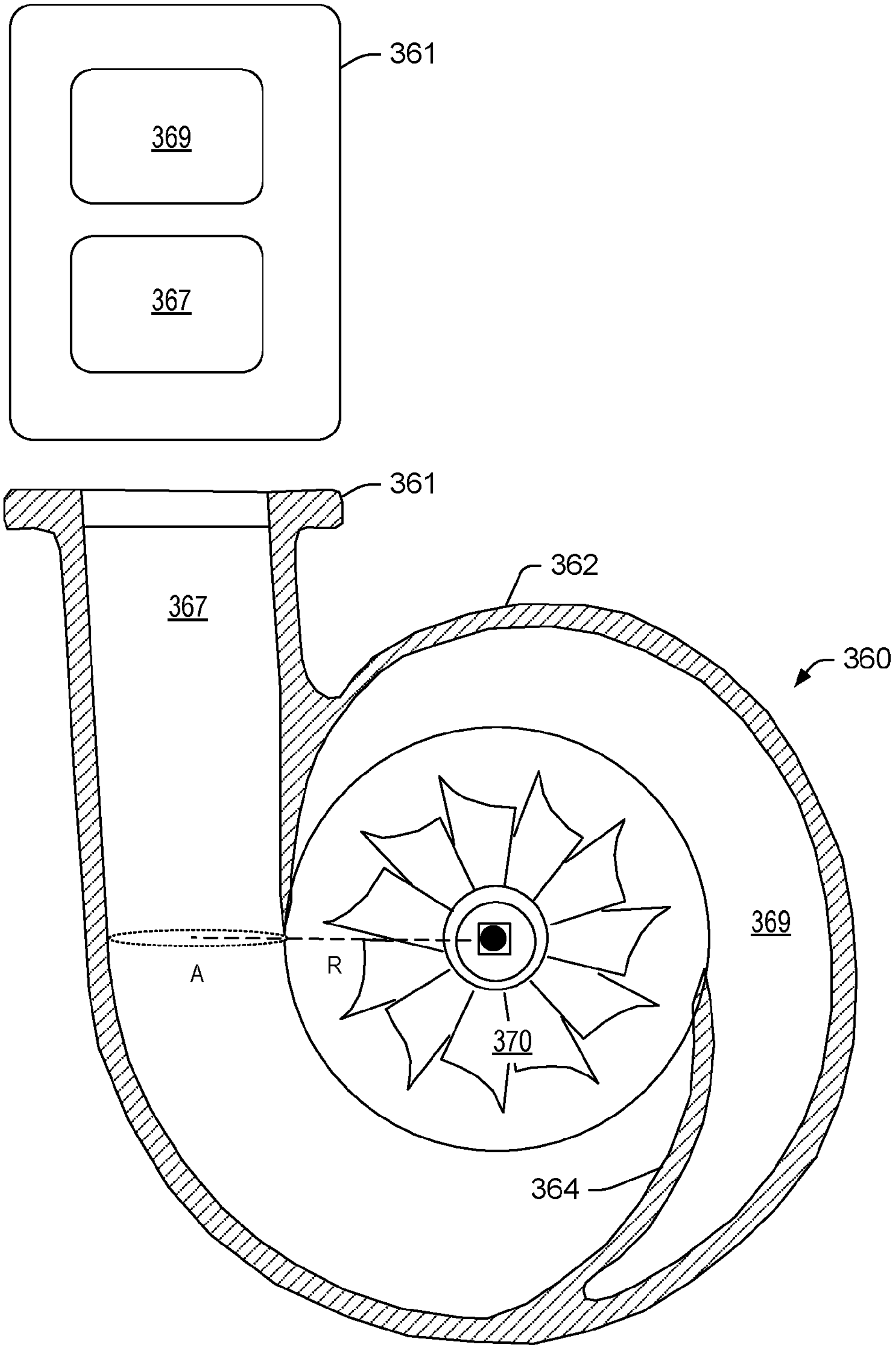
FIG. 3 is a series of views of an example of a portion of an assembly.

FIG. 3 shows an example of a double-channel turbine housing that includes an inlet flange 361, axially adjacent spiral channels 367 and 369, for example, as defined by walls 362 and 364.

For diesel application, a variable nozzle turbine (VNT) can improve turbine energy usage and hence make an engine more fuel efficient. As to gasoline engines, particularly 4 cylinder engines, they tend to be sensitive as to knocking due to backpressure impacting residual gases. Technologies such as twin scroll, enabling flow separation, may be used to improve scavenging and hence low end torque. As an example, pulsating flow may be used to boost turbine power.

Applicability of VNT to gasoline engines may be limited due to its low efficiency characteristic at closed position, impacting knocking sensitivity generated by high back pressure. In addition, closed vane position can act to damp pulse recovery from exhaust gas.

An approach may, for example, act to keep flow separation as far of the turbine wheel via a VNT type of approach that may be used to improve fuel efficiency.

As an example, a variable nozzle may be combined with a twin flow housing. As an example, a mechanism may include one or two vanes that may, for example, move (e.g., pivot) with respect to a wall, which may be a fixed wall. For example, consider a vane or vanes that may be positioned to act as "extensions" of a housing tongue or tongues (e.g., to continue flow separation as far as to a turbine wheel creating a twin flow nozzle). As an example, two vanes may act to define two approximately 180 degree segments of a nozzle circumference area (e.g., between both vanes) where movable vanes may be added to one or both of the segments (e.g., in a VNT approach, etc.). As an example, an end portion of a wall (e.g., a wall end) may be a tongue and a vane may act to alter tongue shape, tongue length, tongue continuity, etc.

As an example, an orientation of vanes may provide for a pulse volute while another orientation of vanes may provide for an open volute. In such an example, twin flow may occur in the open volute, which may help higher engine RPM (e.g., consider Stau-Stau or traffic-traffic approaches).

As an example, applied to an axial wheel (e.g., dual-boost variable twin flow) vanes may act to combine ultra-low inertia and variable twin flow.

As an example, a turbine assembly may be employed to address one or more backflow issues. As an example, one or more vanes may be actuated to address backflow of exhaust gas during operation (e.g., depending on power demand, mass flow, volume flow, etc.).

Figure 4:
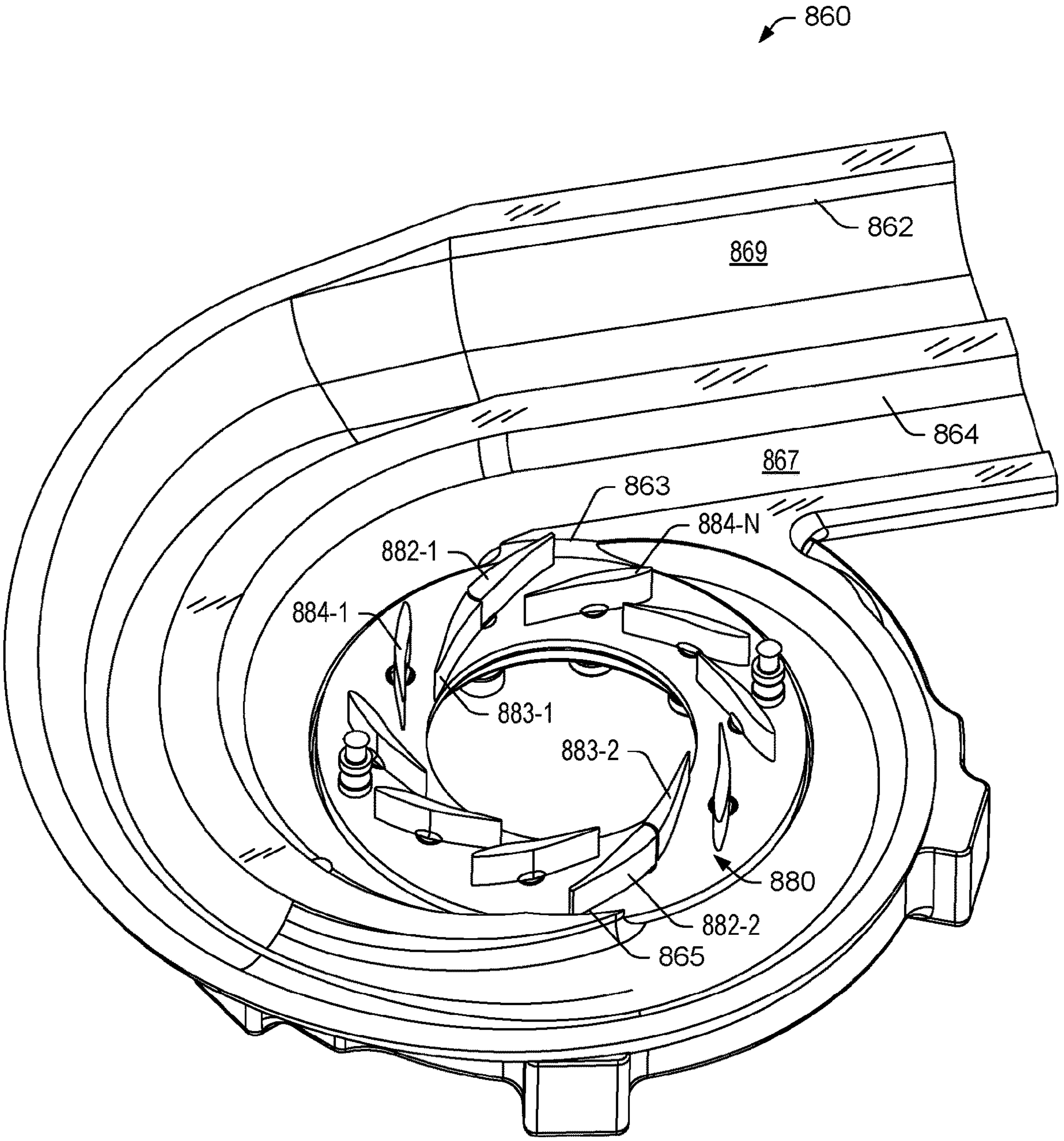
FIG. 4 is a perspective view of an example of a portion of an assembly that includes a variable geometry mechanism.

FIG. 4 shows an example of a portion of an assembly 860 that includes a variable geometry mechanism 880. As shown, the assembly 860 includes a body with a wall 862 and a wall 864 that define paths 867 and 869. The wall 862 includes a wall end 863 at a turbine wheel space and the wall 864 includes a wall end 865 at the turbine wheel space. The variable geometry mechanism 880 includes vanes 882-1 and 882-2 and vanes 884-1 to 884-N. Also shown are structures 883-1 and 883-2. The structures 883-1 and 883-2 may be fixed or optionally movable. As shown, the vanes 882-1 and 882-2 may form relatively continuous surfaces with the structures 883-1 and 883-2. Pivoting of the vanes 883-1 and 883-2 may alter these surfaces to direct exhaust gas, for example, with respect to paths 867 and 869.

Figure 8:
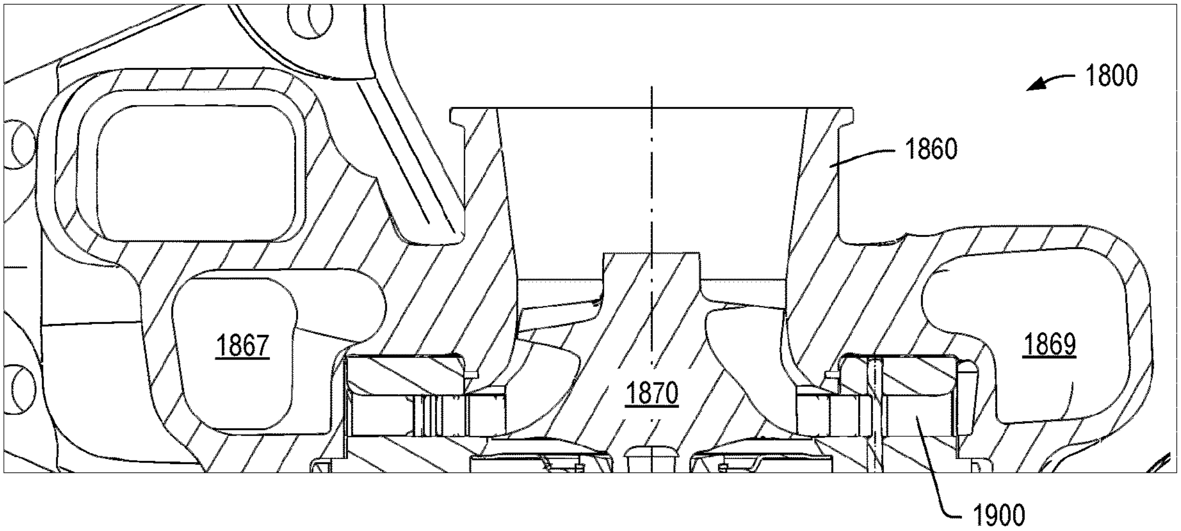
FIG. 8 shows a cutaway of a portion of the assembly of FIG. 7.

As shown in the example of FIG. 8, the vane 882-1 may be pivotable with respect to the wall end 863, which is fixed, and the vane 882-2 may be pivotable with respect to the wall end 865, which is fixed. In such an example, flow at the wall ends 863 and 865 may be altered via pivoting of the vanes

882-1 and 882-2. Such pivoting may alter flow in the paths (or channels) 867 and 869 to the turbine wheel space. An operational mode may coordinate pivoting of vanes 882-1 and 882-2 with pivoting of the vanes 884-1 to 884-N. As an example, the vanes 884-1 to 884-N may include two sets, one corresponding to each of the paths 867 and 869. As an example, such sets may be independently adjustable or, for example, adjustable in unison. As an example, the vanes 882-1 and 882-2 and the vanes 884-1 to 884-N may be adjustable in unison. As an example, the vanes 882-1 and 882-2 may be independently adjustable from the vanes 884-1 to 884-N.

As an example, an assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first adjustable divider vane disposed adjacent to the inner wall end; a second adjustable divider vane disposed adjacent to the outer wall end; and at least one set of adjustable variable geometry nozzle vanes that define nozzle throats that direct flow of exhaust gas from at least one of the exhaust gas channels to the turbine wheel space.

Figure 5:
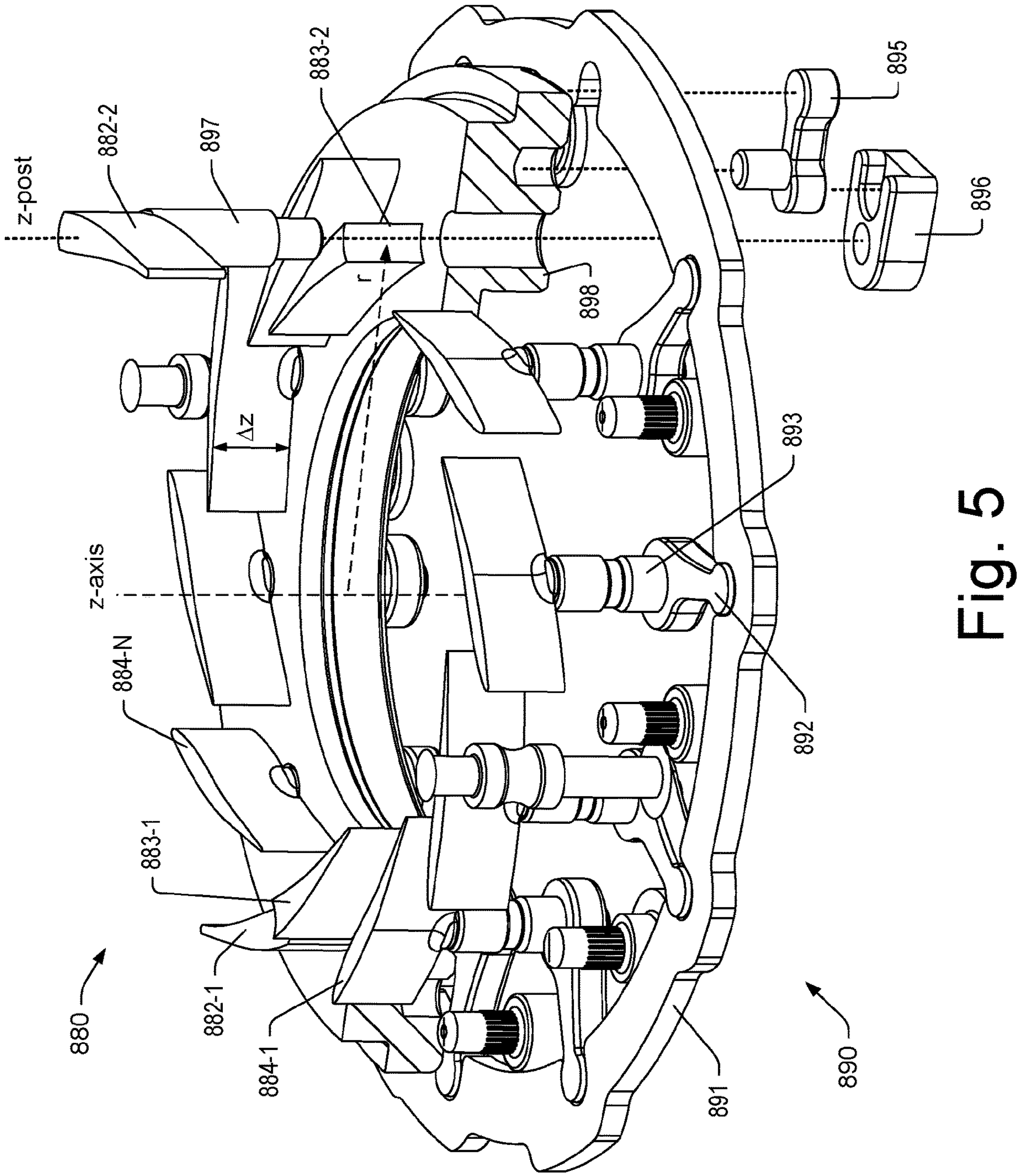
FIG. 5 is a perspective view of a portion of an example of an assembly that includes a variable geometry mechanism.

FIG. 5 shows a portion of the assembly 860 of FIG. 4, particularly, a cutaway and partially exploded view. In the example of FIG. 5, various components, features, etc., may be described, for example, with respect to a z-axis that can coincide with a rotational axis of a turbine wheel. As shown, the z-axis may be a reference to define various radial and/or axial dimensions. For example, vanes can include a vane height 1'1Z and one or more vane posts can be disposed at a radial distance r from the z-axis, which may be referred to as a central axis. As an example, various components can be concentric (e.g., substantially aligned with respect to the z-axis). As an example, during operation, one component may be fixed with respect to the z-axis while another component rotates about the z-axis. As an example, vanes may rotate about individual post axes such as, for example, individual z-post axes. As shown in the example of FIG. 5, the z-post axis labeled may be disposed a radial distance r from the z-axis.

As shown in FIG. 5, the variable geometry mechanism 880 includes a subassembly 890 that includes a ring 891, which may be a rotatable ring (e.g., a rotatable unison ring) where the ring 891 may be rotatable about the z-axis. In the example of FIG. 5, the ring 891 includes sockets that can receive respective lobe ends of control links 892 that are operatively coupled to respective vane posts 893. As shown in the example of FIG. 5, a socket of the ring 891 may accept a lobe end of a first control link 895, which, in turn, operatively couples to a second control link 896 that operatively couples to a post 897 of the vane 882-2. The vane 882-1 may be operatively coupled to such components as well (e.g., another set of the first control link 895 and the second control link 896, etc.). The ring 891 may be supported at least in part by rollers (e.g., along an inner circumference and/or an outer circumference).

Also shown in FIG. 5 is a nozzle ring 898, which is presented in a cutaway view with cross-sectioned surfaces across post bores for posts of the vanes 882-1 and 882-2 (see, e.g., the post 897). As an example, the nozzle ring 898 may be substantially centered about the z-axis and may be disposed in an assembly such that the nozzle ring 898 is substantially fixed such that it does not rotate about the z-axis. As an example, the nozzle ring 898 may be operatively coupled to one or more biasing mechanisms (e.g., resilient plate or plates, spring or springs, etc.) such that some movement of the nozzle ring 898 may occur along the z-axis. In the example of FIG. 5, the nozzle ring 898 includes an upper surface and a lower surface where the post bores for the vanes 882-1, 882-2, and 884-1 to 884-N extend from the lower surface to the upper surface. Posts disposed in the post bores can be rotated via the rotation of the ring 891 (e.g., rotated about respective post axes) to thereby pivot vanes to which the posts are attached. A vane fronting surface or surfaces may be disposed to one side of the vanes, for example, a hub side of each of the vanes, opposite a base side of each of the vanes, may face a vane fronting surface or surfaces, where the base sides face the upper surface of the nozzle ring 898. In such an example, nozzles may be defined between the upper surface of the nozzle ring 898 and the vane fronting surface or surfaces and between adjacent vanes. As an example, a space between two adjacent vanes may be referred to a throat where, for example, the shape of the throat may be adjustable via pivoting of one or both of the two adjacent vanes. Shapes of throats may direct exhaust gas, for example, in a more tangential or a more axial manner with respect to an axis of rotation of a turbine wheel disposed in a turbine wheel space that may be defined in part via the nozzle ring 898.

In the example of FIG. 5, the nozzle ring 898 includes a partial bore that can receive a peg that extends axially from the first control link 895. As shown, the first control link 895 (e.g., control arm) includes lobe ends, one that is received by a socket of the ring 891 and one that is received by a socket of the second control link 896. In such an example, rotation of the ring 891 causes the first control link 895 to pivot about the peg (e.g., a peg axis), which, in turn, causes the second control link 896 to pivot. As shown, the second control link 896 includes an aperture that receives an end of the post 897. In such an example, the post 897 may be fixed with respect to the second control link 896 such that when the second control link 896 pivots, the vane 882-2 pivots.

While a ring with sockets and control links with lobes is shown in FIG. 5, vanes may be controllable via one or more other types of mechanisms. For example, a mechanism or mechanisms may include multiple rings, a ring mechanism and another type of mechanism, etc. As an example, the vanes 884-1 to 884-N may be adjustable independently of the vanes 882-1 and 882-2 or the vanes may be adjustable in a coordinate manner (e.g., via rotation of a ring mechanism, etc.).

As an example, a mechanism may be actuatable (e.g., adjustable, etc.) via a mechanical actuator, an electronic actuator, a pneumatic actuator, a hydraulic actuator, etc. As an example, an actuator may be a hybrid actuator (e.g., a combination of two or more of the aforementioned types of actuators). As an example, an actuator may be operatively coupled to an engine control unit (ECU). As an example, a processor may execute instructions stored in memory such that an actuator is instructed to actuate a mechanism or mechanisms that can adjust a vane, a pair of vanes, a set of vanes, sets of vanes, etc. As an example, an actuator may actuate a ring where lobe ends of control links move with the ring to thereby rotate, directly and/or indirectly, vanes (e.g., via vane posts, etc.).

Figure 6A:
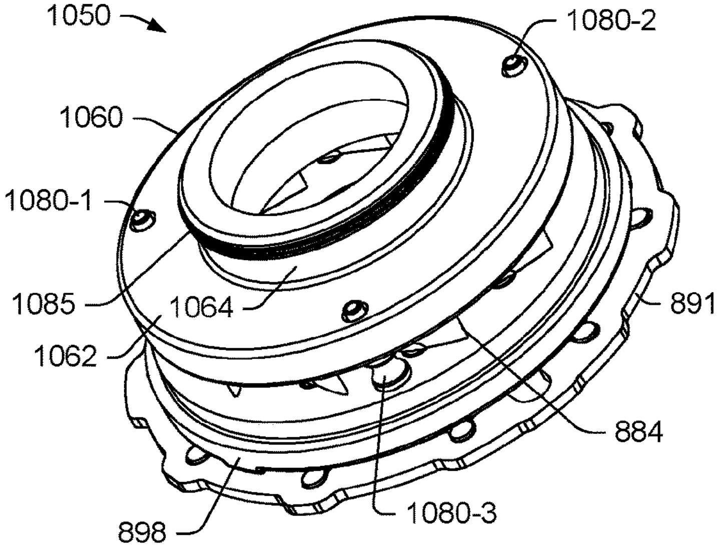
FIGS. 6A, 6B and 6C are a perspective view of assemblies, a cross-sectional cutaway view thereof and a perspective view of a portion of an assembly that includes a variable geometry mechanism.
Figure 6B:
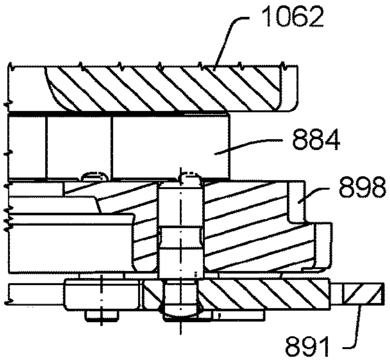
Figure 6C:
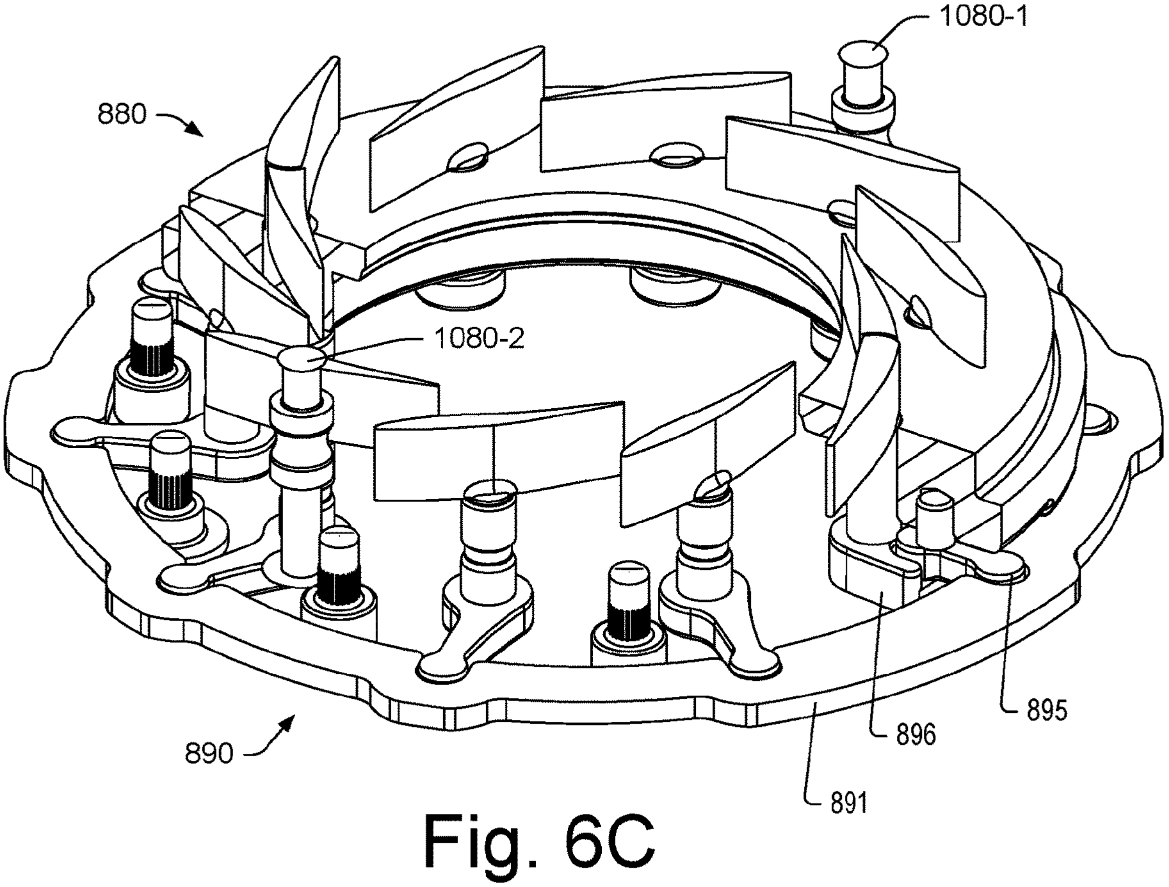

FIG. 6A shows a portion of the assembly 860 as including another assembly 1050, FIG. 6B shows a cross-sectional view that includes a portion of the assembly 860 and a portion of the assembly 1050 and FIG. 6C shows a portion of the assembly 860 where the first and second control links 895 and 896 are installed and controllable via rotation of the ring 891. FIG. 6A shows an example of an insert 1060, which includes a cylindrical portion 1064 where the insert 1060 can include one or more seal elements 1085, which may be disposed in one or more grooves.

In FIG. 6A, the assembly 1050 includes the insert 1060 that is operatively coupled to the variable geometry mechanism 880 via a plurality of spacers 1080-1, 1080-2 and 1080-3, noting that fewer or more spacers may be included. For example, in FIG. 6C, two spacers are illustrated 1080-1 and 1080-2. In the example of FIG. 6A, the insert 1060 includes a substantially planar base portion 1062 and the cylindrical portion 1064 that rises axially from the substantially planar base portion 1062. As shown, the cylindrical portion 1064 can include one or more seal elements 1085. As an example, a different type of seal element or seal elements may be included. In the cross-sectional cutaway view of FIG. 6B, a vane 884 is shows as being disposed between a lower surface of the substantially planar base portion 1062 of the insert 1060 and an upper surface of the nozzle ring 898. As an example, the spacers (e g, 1080-1 and 1080-2 or 1080-1, 1080-2, 1080-3, etc.) may space the insert 1060 an axial distance from the nozzle ring 898 to define a nozzle axial height of a nozzle space where pivotable vanes disposed in the nozzle space can include vane heights that provide clearance for pivoting in the nozzle space. As an example, the insert 1060 can include a shroud surface that is contoured in a manner that defines a clearance with respect to blades of a turbine wheel. The cylindrical portion 1064 of the insert 1060 may be defined by an inner radius that defines a flow path for exhaust such that exhaust entering the nozzle space can flow about a turbine wheel and then exit.

Figure 7:
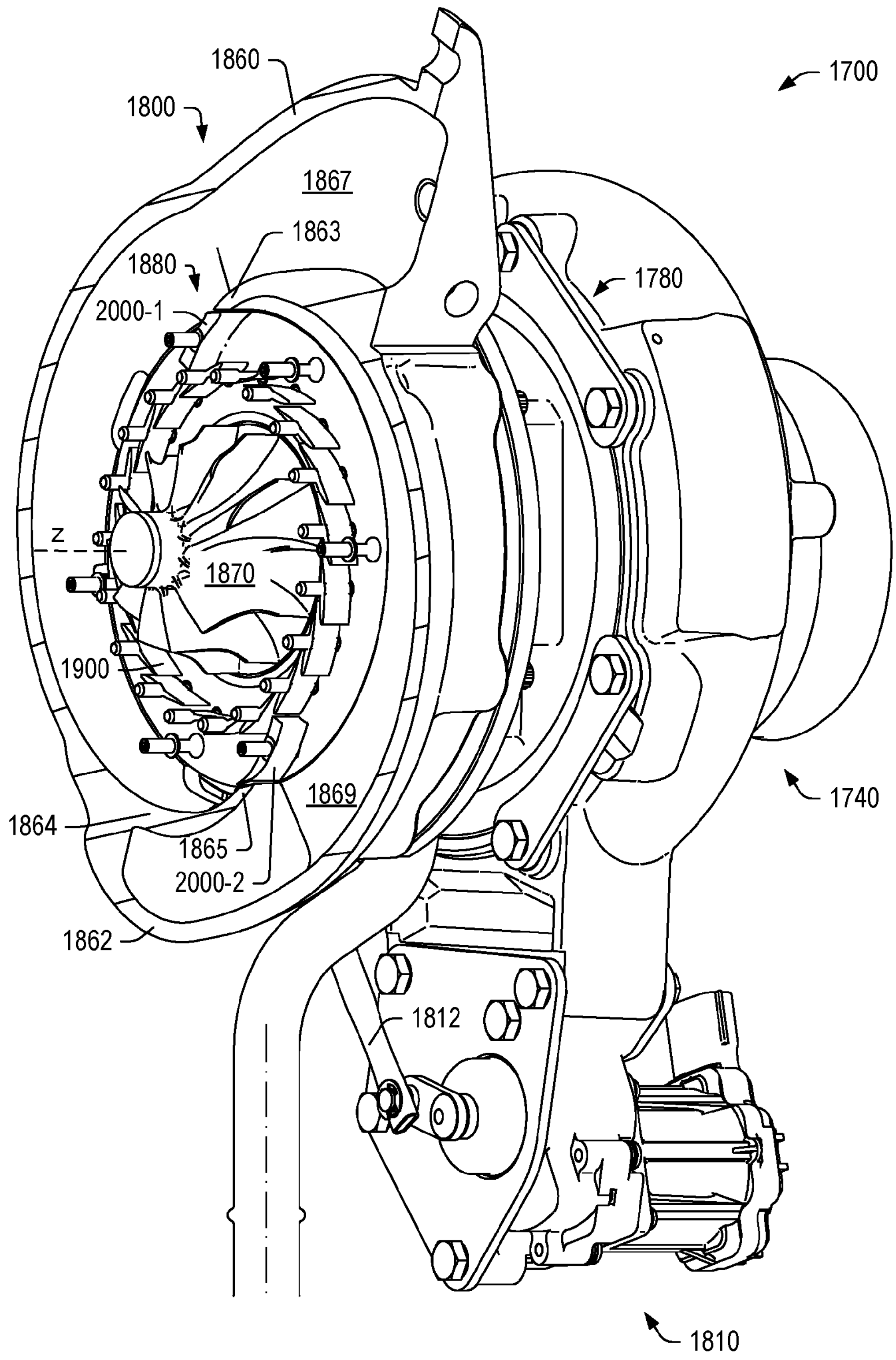
FIG. 7 shows a cutaway view of an example of an assembly.

FIG. 7 shows an example of an assembly 1700 that includes a compressor assembly 1740, a center housing assembly 1780 and a turbine assembly 1800 where the turbine assembly 1800 is coupled to the center housing assembly 1780.

As shown in the example of FIG. 7, the turbine assembly 1800 includes an actuator 1810 with a control arm 1812 for positioning vanes 1900 of the turbine assembly 1800. As shown, the vanes 1900 are positioned radially outwardly from a turbine wheel 1870, which defines a rotational axis z, which may be utilized to define one or more features of the turbine assembly. For example, various features may be defined in a cylindrical coordinate system with axial (z), radial (r) and azimuthal (0) coordinates.

As shown, the turbine assembly 1800 includes a turbine housing 1860 that defines a first exhaust gas channel 1867 and a second exhaust gas channel 1869, in part, via a wall end 1863 of an outer wall 1862 and a wall end 1865 of an inner wall 1864. As explained, a turbine housing can include wall ends that can be part of scroll or volute walls that provide for exhaust flow to a turbine wheel. In the example of FIG. 7, the wall ends 1863 and 1865 can be ends of two scroll or volute walls (e.g., the walls 1862 and 1864) that define the exhaust gas channels 1867 and 1869.

As shown, the turbine housing 1860 includes the inner wall 1864 and the outer wall 1862 that define the first exhaust gas channel 1867 and the second exhaust gas channel 1869 to a turbine wheel space for the turbine wheel 1870 where the inner wall 1864 includes the inner wall end 1865 at the turbine wheel space and the outer wall 1862 includes the outer wall end 1863 at the turbine wheel space. In the example of FIG. 7, a first flow body 2000-1 is disposed adjacent to the outer wall end 1863 and a second flow body 2000-2 is disposed adjacent to the inner wall end 1865. As shown, the turbine assembly 1800 includes sets of adjustable variable geometry nozzle vanes 1900 that define nozzle throats that direct flow of exhaust gas from the exhaust gas channels 1867 and 1869 to the turbine wheel space.

As explained, the actuator 1810 can control position of the vanes 1900 via the control arm 1812, for example, to position the vanes 1900 in a closed position and in one or more open positions. In such an example, the closed position can define minimum flow conditions. For example, vane-to-vane contact may not exist in the closed position such that relatively small, narrow channels exist where some amount of flow may exist, which can be defined as minimum or minimal flow (e.g., for a given amount of pressure, etc.). In the example of FIG. 7, the turbine assembly can include a cartridge 1880 that carries at least the vanes 1900. As an example, the flow bodies 2000-1 and 2000-2 may be fit to the cartridge 1880 or otherwise positioned with respect to the cartridge 1880 and adjacent to the wall ends 1863 and 1865, respectively. As an example, the flow bodies 2000-1 and 2000-2 may be positioned statically such that they do not move while the vanes 1900 can be pivotably moved with respect to the static flow bodies 2000-1 and 2000-2.

FIG. 8 shows a cross-sectional view of the assembly 1800 of FIG. 7, where the exhaust gas channels 1867 and 1869 are illustrated along with the turbine housing 1860 and the turbine wheel 1870 and the vanes 1900, which are in an open position.

Figure 9:
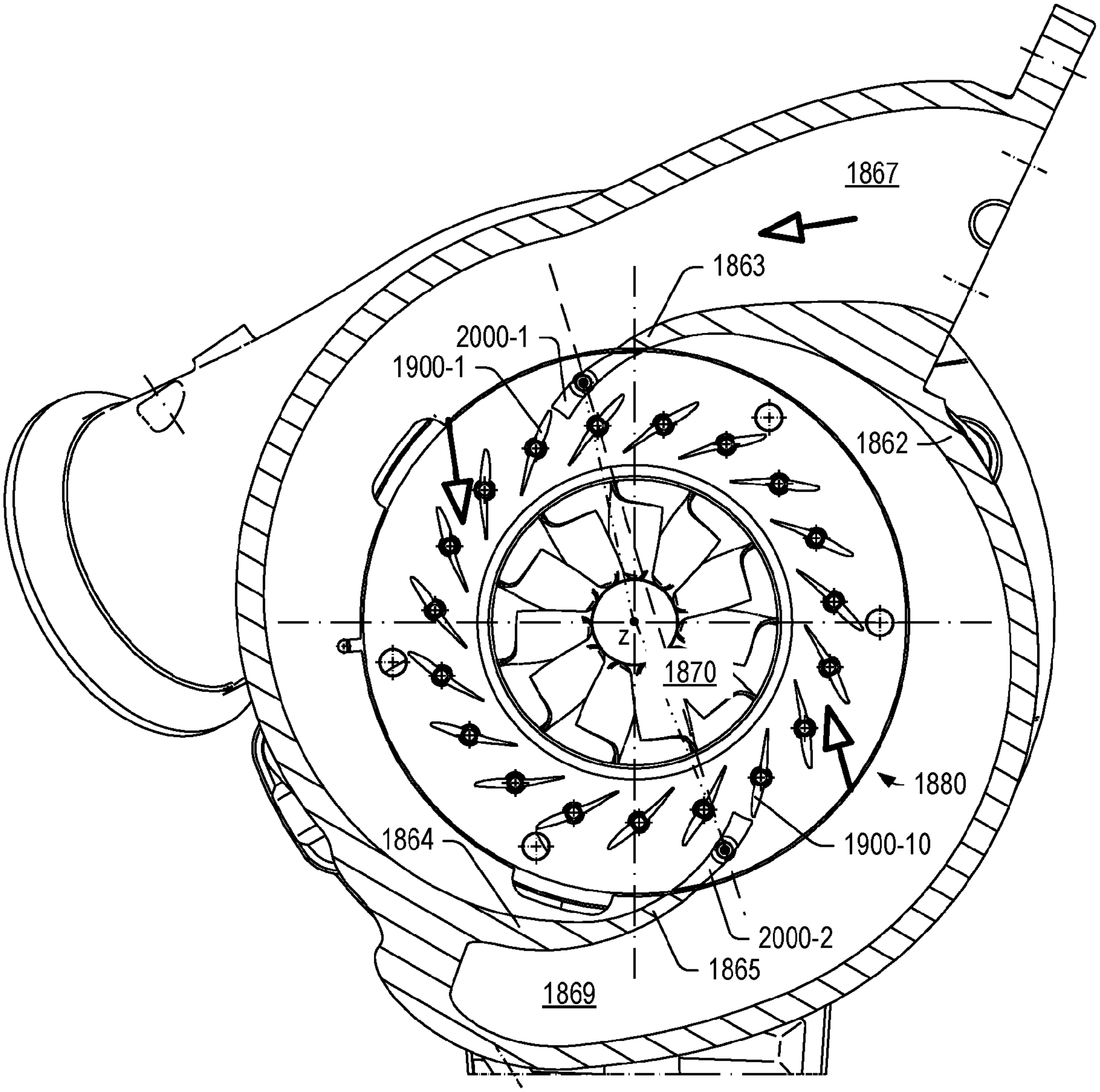
FIG. 9 shows a cutaway view of a portion of the assembly of FIG. 7.

FIG. 9 shows a cutaway, plan view of the assembly 1800 of FIG. 7. In the example of FIG. 9, the first flow body 2000-1 may be disposed at an angle of approximately 102 degrees from horizontal (e.g., 12 degrees from vertical) and the second flow body 2000-2 may be disposed at an angle of approximately 292 degrees or −68 degrees from horizontal (e.g., −22 degrees from vertical). In the example of FIG. 9, in a clockwise direction, there are eight of the vanes 1900 between the two of the vanes 1900-1 and 1900-10 associated with the first and second flow bodies 2000-1 and 2000-2; while, in a counterclockwise direction, there are nine of the vanes 1900 between the two of the vanes 1900-1 and 1900-10 associated with the first and second flow bodies 2000-1 and 2000-2. In the example of FIG. 9, the number of the vanes 1900 is nineteen. As an example, a turbine assembly may include fewer or more vanes, an even number of vane or an odd number of vanes, etc. As an example, a turbine assembly can include at least five vanes and less than forty vanes.

As explained, line drawn between posts of the vanes 1900-1 and 1900-10 may not cross the rotational axis z of the turbine wheel 1870, for example, in the example of FIG. 9, such a line (dashed line) is offset to the right of the rotational axis z.

Figure 10:
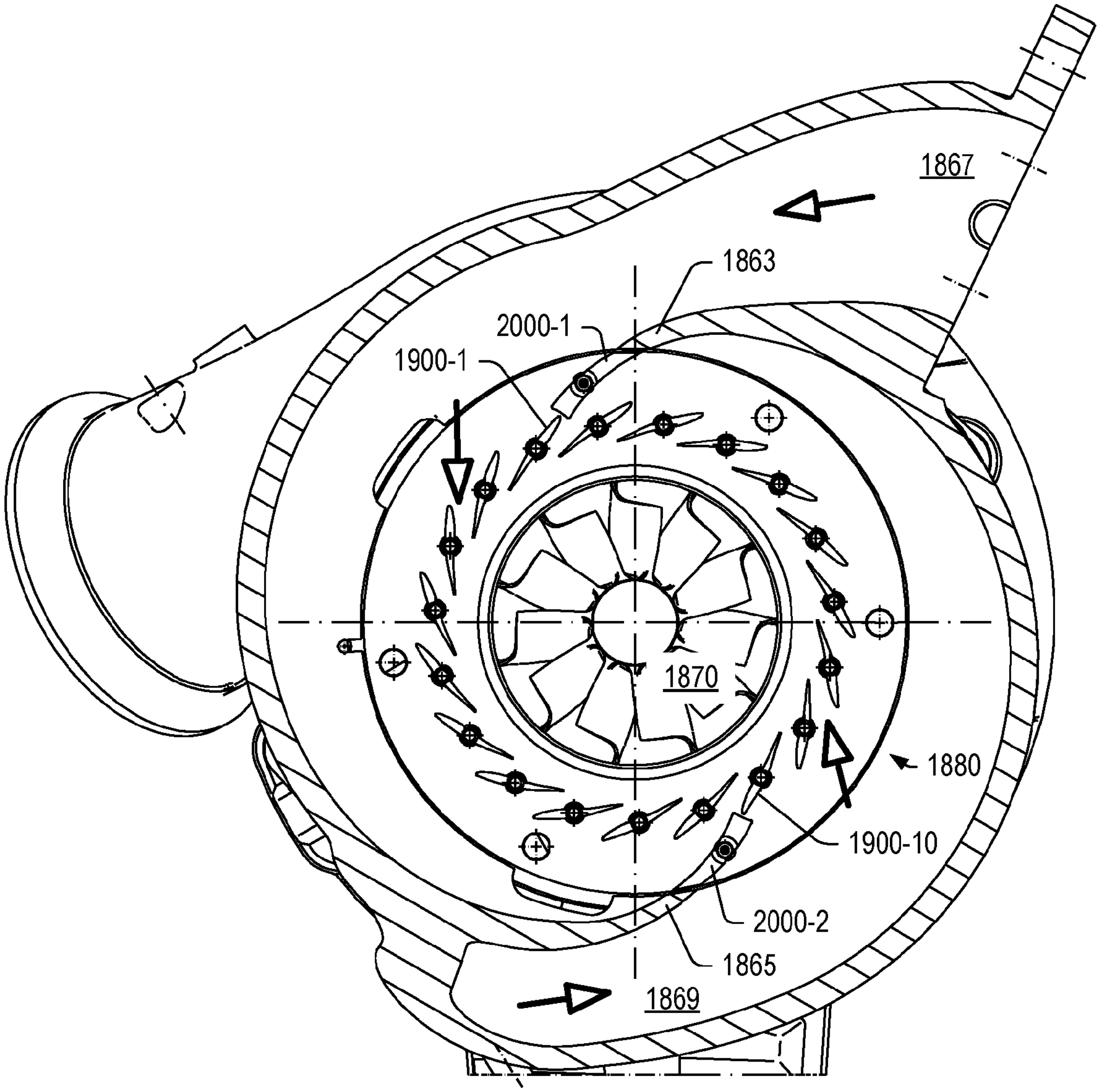
FIG. 10 shows a cutaway view of a portion of the assembly of FIG. 7.

FIG. 10 shows a cross-sectional view of the assembly 1800 of FIG. 7, where the exhaust gas channels 1867 and 1869 are illustrated along with the turbine housing 1860 and the turbine wheel 1870 and the vanes 1900, which are in an open position that is less open than the open position of the example of FIG. 9.

Figure 11:
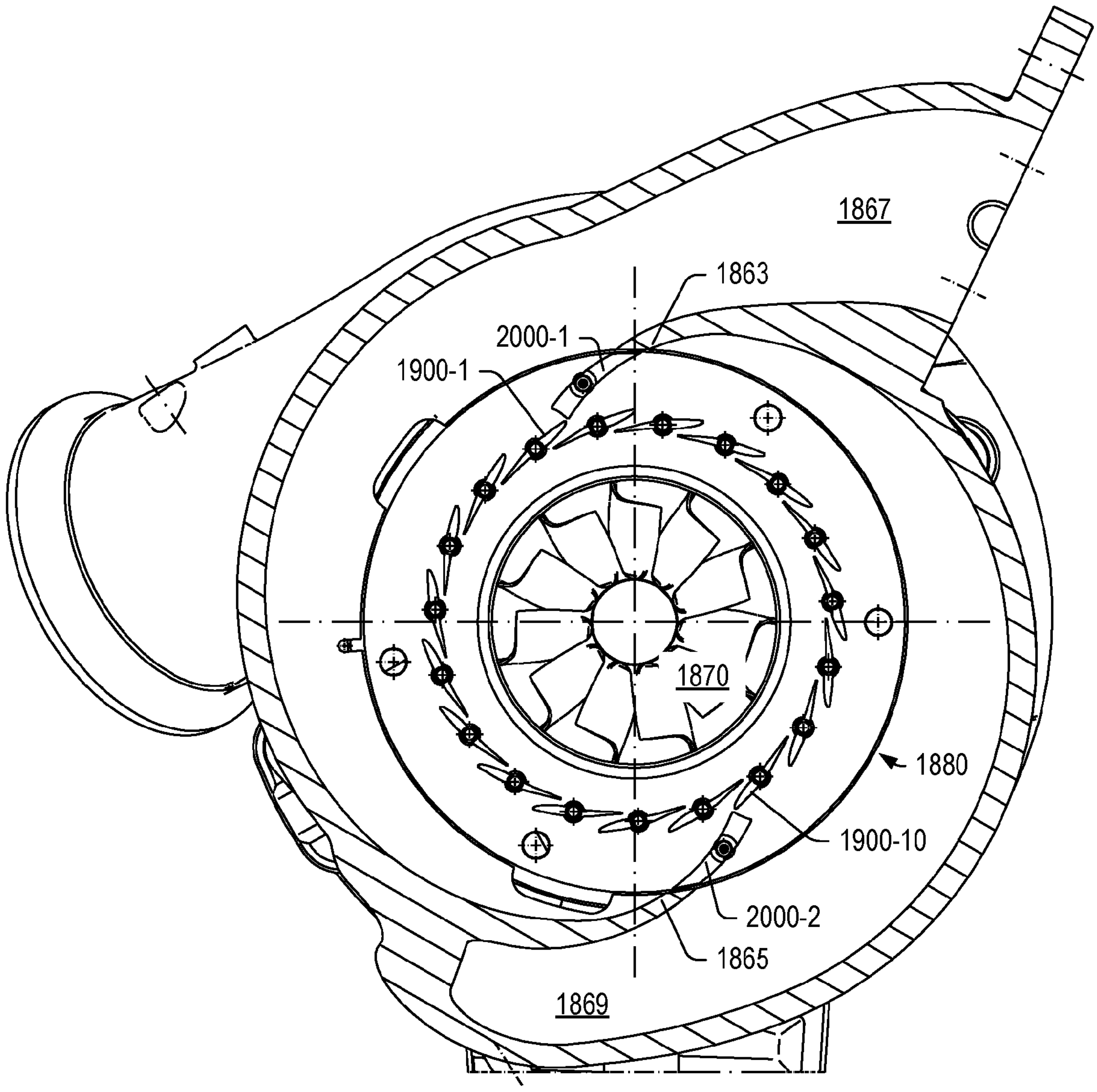
FIG. 11 shows a cutaway view of a portion of the assembly of FIG. 7.

FIG. 11 shows a cross-sectional view of the assembly 1800 of FIG. 7, where the exhaust gas channels 1867 and 1869 are illustrated along with the turbine housing 1860 and the turbine wheel 1870 and the vanes 1900, which are in an open position that is less open than the open position of the example of FIG. 10.

FIGS. 9, 10 and 11 show how the vanes 1900 may be controllably moved (e.g., positioned) from a more open position to a more closed position. As the vanes 1900 become more closed (e.g., less open), they act as obstacles to hinder flow of exhaust gas to the turbine wheel 1870 (e.g., to the turbine wheel space). As an example, a fully closed position can involve vane-to-vane contact of the vanes 1900. For example, where vane-to-vane contact of the vanes 1900 occurs, contact regions may act to further hinder flow of exhaust gas (e.g., to seal vane surfaces against each other). In the views of FIGS. 9, 10 and 11, each of the vanes 1900 is rotated clockwise in moving from a more open position to a more closed position (e.g., less open position).

Figure 12:
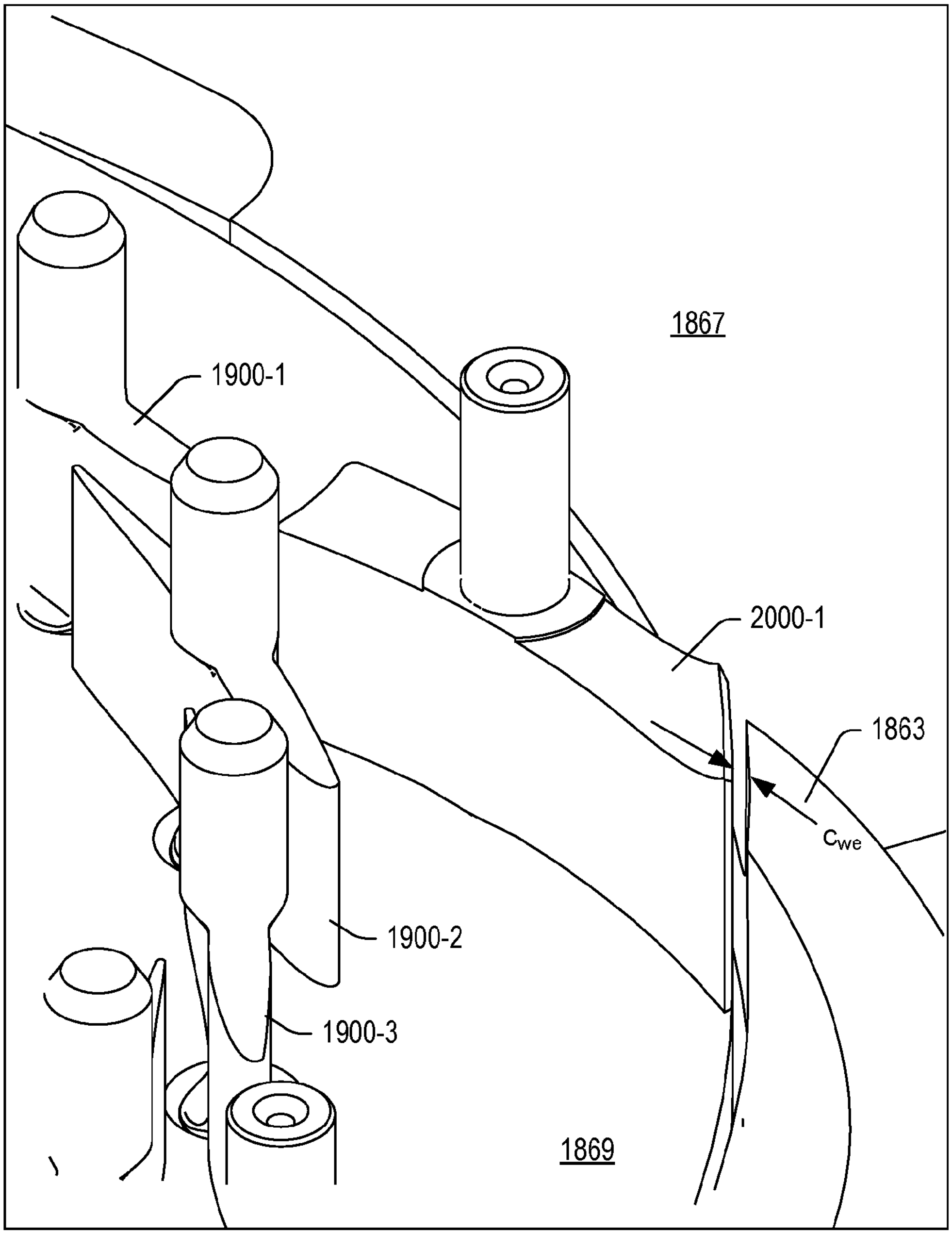
FIG. 12 shows a perspective view of a portion of the assembly of FIG. 7.

FIG. 12 shows a perspective view of a portion of the assembly 1800 where three of the vanes 1900 are labeled as 1900-1, 1900-2 and 1900-3. In the example of FIG. 12, portions of the exhaust gas channels 1867 and 1869 are approximately illustrated where the wall end 1863 and the first flow body 2000-1 act as barriers to fluid communication between the exhaust gas channels 1867 and 1869.

As explained, exhaust gas channels may be fed by different sets of cylinders of an internal combustion engine where the cylinders include pistons coupled to a rotatable shaft The pistons can be operable according to a firing order, along with intake strokes and exhaust strokes. As to a firing order of a four cylinder internal combustion engine with pistons labeled 1, 2, 3 and 4, consider a straight-four engine as having a firing order of 1-3-4-2 or a firing order of 1-2-4-3; and, for a flat-four engine, consider pistons labeled R1, R2, L1 and L2 with a firing order of R1-R2-L1-L2. As shown in FIG. 2A, one exhaust gas channel may receive exhaust from two cylinders (e.g., 1 and 4) while another exhaust gas channel may receive exhaust from two different cylinders (e.g., 2 and 3). As an example, an engine may be in an inline configuration, a V configuration or a flat configuration. As an example, an engine may include multiple manifolds. In such an example, each of the multiple manifolds may provide for passage of exhaust gas to a respective exhaust gas channel of a turbine assembly. As an example, an engine may include more than one cylinder and less than 20 cylinders (e.g., consider 3, 4, 5, 6, 8, 10, 12, etc.).

As an example, a manifold may provide for exhaust gas recirculation (EGR), for example, to an intake conduit and/or manifold. In such an example, exhaust flow in exhaust gas channels may differ (e.g., where one provides for EGR and another does not).

As explained, pulsations may occur in the two exhaust gas channels and/or between the two exhaust gas channels. As an example, an arrangement of features of the assembly 1800 may account for pulsations. For example, where pulsations tend to be strong, a clearance may be increased between a leading edge of a vane and a flow body. In such an approach, pulsations may be somewhat dispersed via freer fluid communication with a larger volume. For example, in FIG. 11, the vane 1900-1 can be rotated an additional number of degrees (e.g., in unison with the other vanes 1900) in a clockwise direction to provide an increased clearance with respect to the first flow body 2000-1, which can allow for increased fluid communication between the exhaust gas channels 1867 and 1869. As an example, a clearance in a closed position of the vanes 1900 with respect to one or more of the flow bodies 2000-1 and 2000-2 may be controlled via positioning of the vanes 1900 (e.g., radius of posts), location of vane posts, distance between vane posts and leading edges, etc. As such, a closed position clearance may be designed to accommodate considerations associated with pulsations (e.g., pulse pressures, etc.). Where pulsations (e.g., pulse pressures) may be strong, clearance(s) may be increased As shown in the example of FIG. 12, a clearance, $C_{we}$, can exist between the flow body 2000-1 and the wall end 1863. Such a clearance may be tailored based on one or more criteria. For example, consider fluid communication as to pulsations, installation clearance, heat expansion/contraction clearance, etc. As explained, where pulsation is strong, such a clearance may be larger to provide for increased fluid communication between the exhaust gas channels 1867 and 1869.

Figure 13:
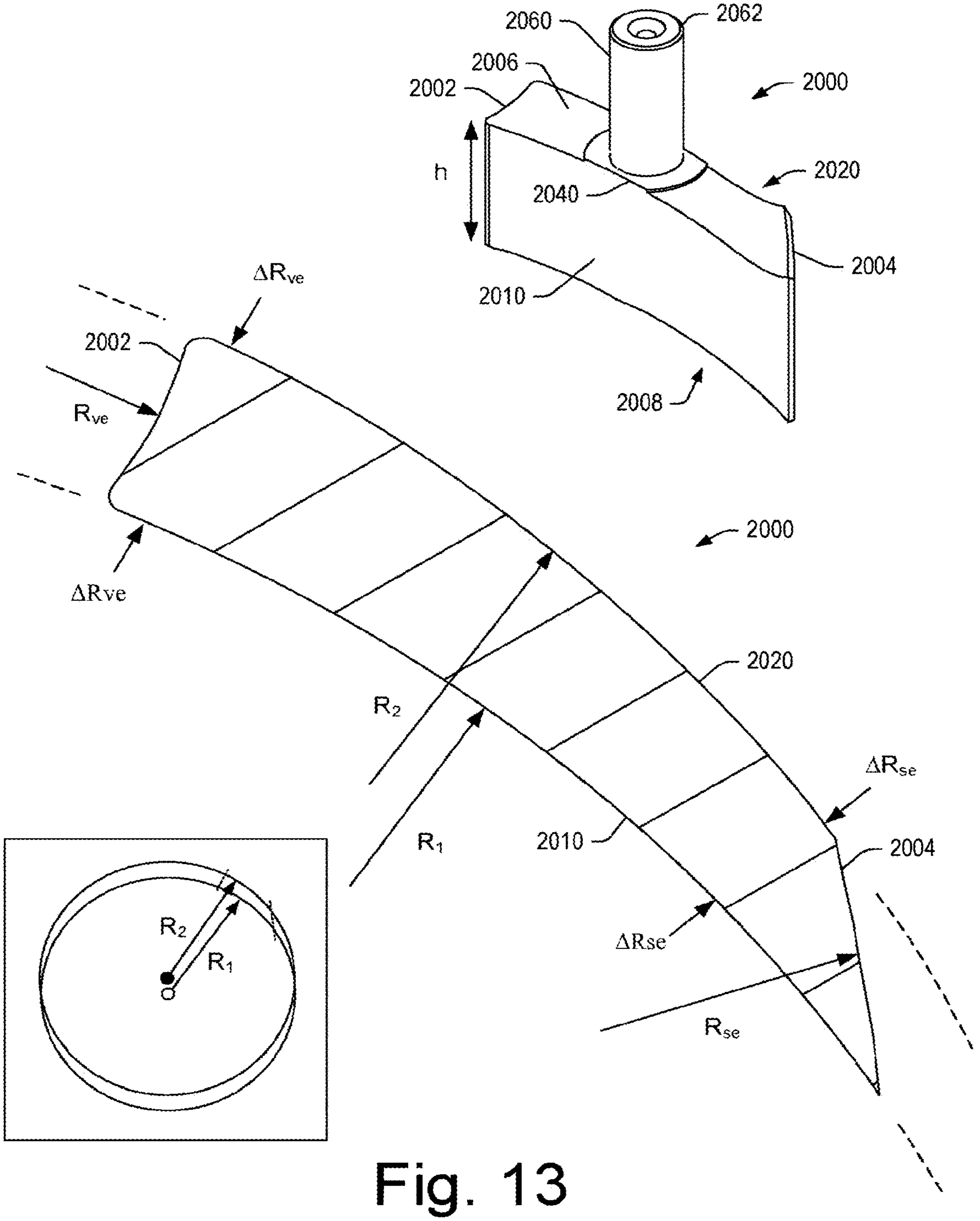
FIG. 13 shows a perspective view and a cross-sectional view of an example of a flow body.

FIG. 13 shows an example of a flow body 2000 in a perspective view and a cross-sectional view. As shown, the flow body 2000 can include a concave trailing surface 2002 and a leading surface 2004, an upper surface 2006 and a lower surface 2008, opposing airfoil surfaces 2010 and 2020, a boss 2040 and a post 2060, which includes a post end 2062. As shown, the boss 2040 may be shaped as a truncated cylinder and be slightly elevated above the upper surface 2006 such that the boss 2040 acts as a spacer, for example, to provide an axial clearance between components of the assembly 1800.

In the example of FIG. 13, the flow body 2000 can be defined by an axial height, h, where the boss 2040 and the post 2060 can be of greater axial heights. As an example, the height of the flow body 2000 may be greater at the leading surface 2004 than at the trailing surface. For example, the height at the leading surface 2004 may be selected to substantially match the height of a wall end while the height at the trailing surface 2002 may be selected to substantially match the height of a vane. As an example, the upper surface 2006 may slope upwards between the boss 2040 and the leading edge 2004.

As to the airfoil surfaces 2010 and 2020, they may be defined using a radius or radii. For example, FIG. 13 shows a radius $R_1$ and a radius $R_2$ that can define the airfoil surfaces 2010 and 2020, respectively. As shown, the trailing surface 2002 may be defined by a radius $R_{ve}$, which can be based on an arc of a leading edge of a vane. For example, consider the radius $R_{ve}$ as being defined by an arc swept by pivoting motion of a leading edge of a vane, R1e, plus a clearance amount, which may be a percentage of $R_{1e}$ (e.g., from 0.1 percent to 25 percent). As shown in the example of FIG. 13, the trailing surface 2002 can include a concavity where the concavity is defined in part by an arc of a circle. As explained, such a trailing surface can be referred to as a concave trailing surface. As an example, a test for concavity may be to draw a line between two points in a body where if the line crosses a boundary of the body (e.g., a surface of the body), the body can be defined as being concave (e.g., as including a concavity) such as having a concave surface. As to the leading surface 2004, it may be defined by a radius $R_{se}$, which can depend on the shape of a well end. As an example, the leading surface 2004 may be a convex leading surface or a flat leading surface. For example, if a line is drawn between ends of the leading surface 2004, the leading surface 2004 is not concave if the line does not cross the leading surface 2004. As explained with respect to the trailing surface 2002, if a line is drawn between ends of the trailing surface 2002, the line is at least in part outside the flow body 2000 such that the trailing surface 2002 is a concave trailing surface. As an example, the trailing surface 2002 may be defined to be concave via a concave arc shape that effectively forms an indented trailing surface 2002 (e.g., indented into the flow body 2000). As an example, a convex arc shape can form a bulging surface (e.g., a convex surface). As an example, a flow body can include a trailing surface that includes a concavity that may be disposed between ends of the trailing surface where one or both of the ends may be radiused and/or chamfered. As to a radiused end, it may be defined as being convex. For example, consider a concave portion of a trailing surface disposed between convex radiused ends of the trailing surface such that the trailing surface can be defined as being a concave trailing surface (e.g., a trailing surface with concavity that can accommodate a leading edge of a vane as it sweeps an arc responsive to pivoting about a pivot axis).

In the example of FIG. 13, an inset geometric diagram shows two circles of radii R1 and R2 that are offset with respect to their centers. As shown, by being offset, an area can be defined where a portion of that area can define the airfoil surfaces 2010 and 2020 of the flow body 2000. As shown, the thickness of the flow body 2000 can differ over its length. For example, it may be thicker, $R_{ve}$, at the vane trailing surface 2002 and thinner, $R_{se}$, at the leading surface 2004. In such an example, the thicknesses can be selected to accommodate a pivoting range of a leading edge of a vane and/or to accommodate a wall end thickness. Where the flow body 2000 is to accommodate a larger arc swept by a leading edge of a vane (e.g., defined by pivot range in terms of degrees, etc.), the flow body 2000 can be thicker at the trailing surface 2002; and, where the flow body 2000 is to accommodate a smaller arc swept by a leading edge of a vane (e.g., defined by pivot range in terms of degrees, etc.), the flow body 2000 can be thinner at the trailing surface 2002.

Figure 14:
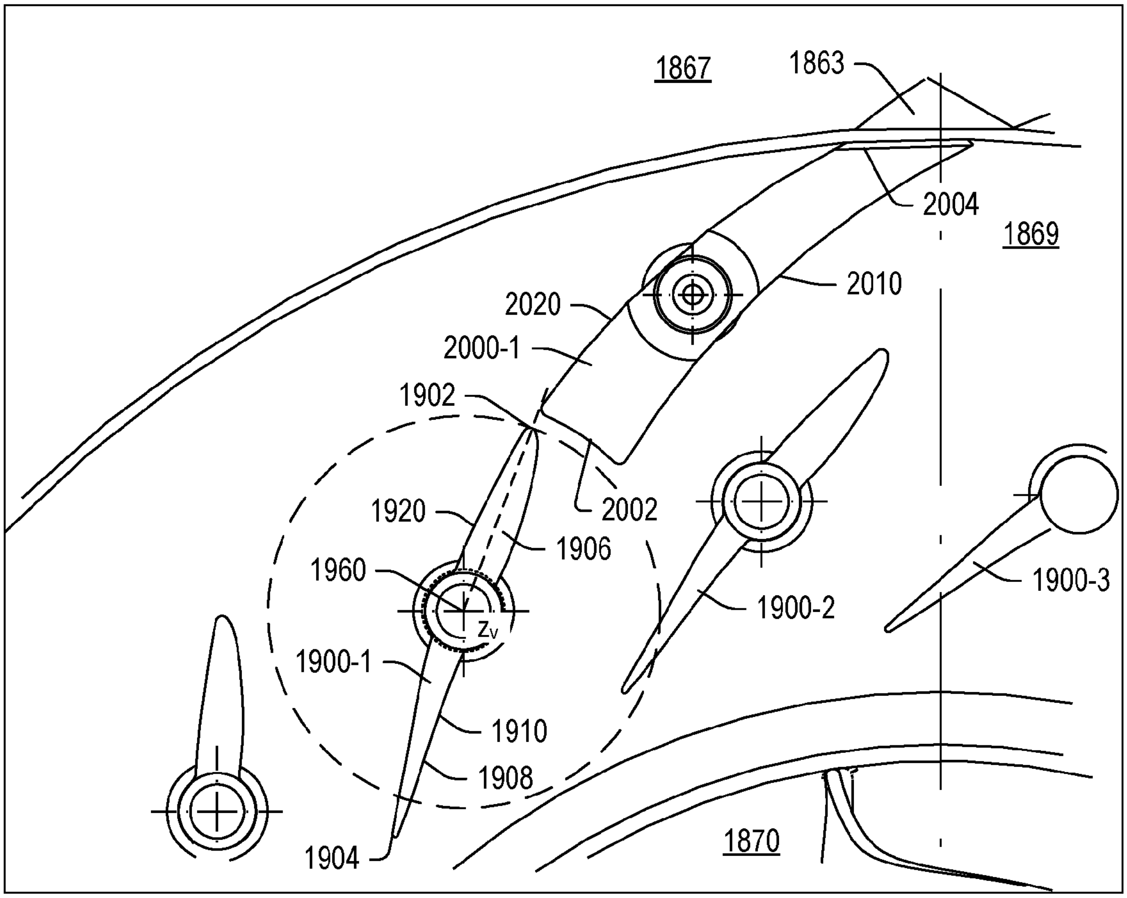
FIG. 14 shows an enlarged cutaway view of a portion of the assembly of FIG. 9.
Figure 15:
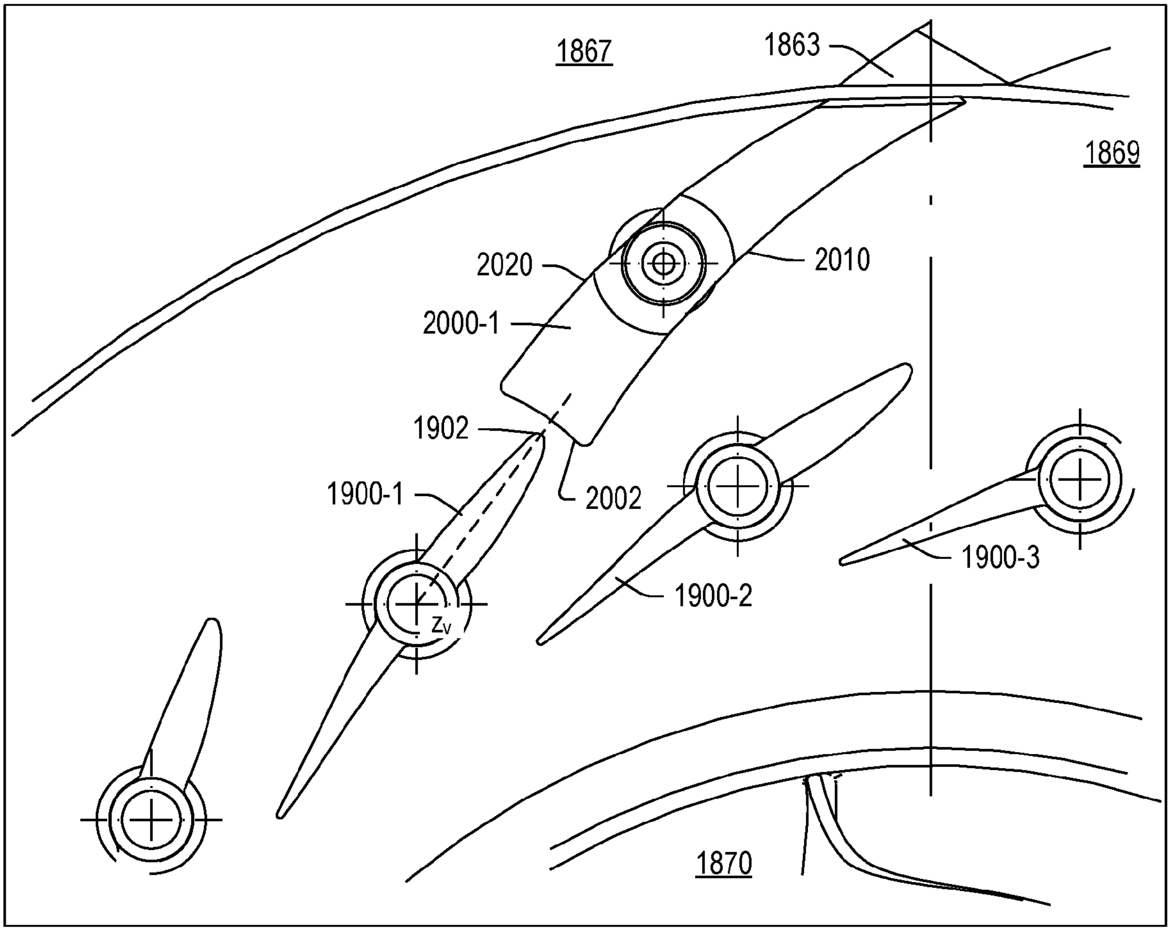
FIG. 15 shows an enlarged cutaway view of a portion of the assembly of FIG. 10.
Figure 16:
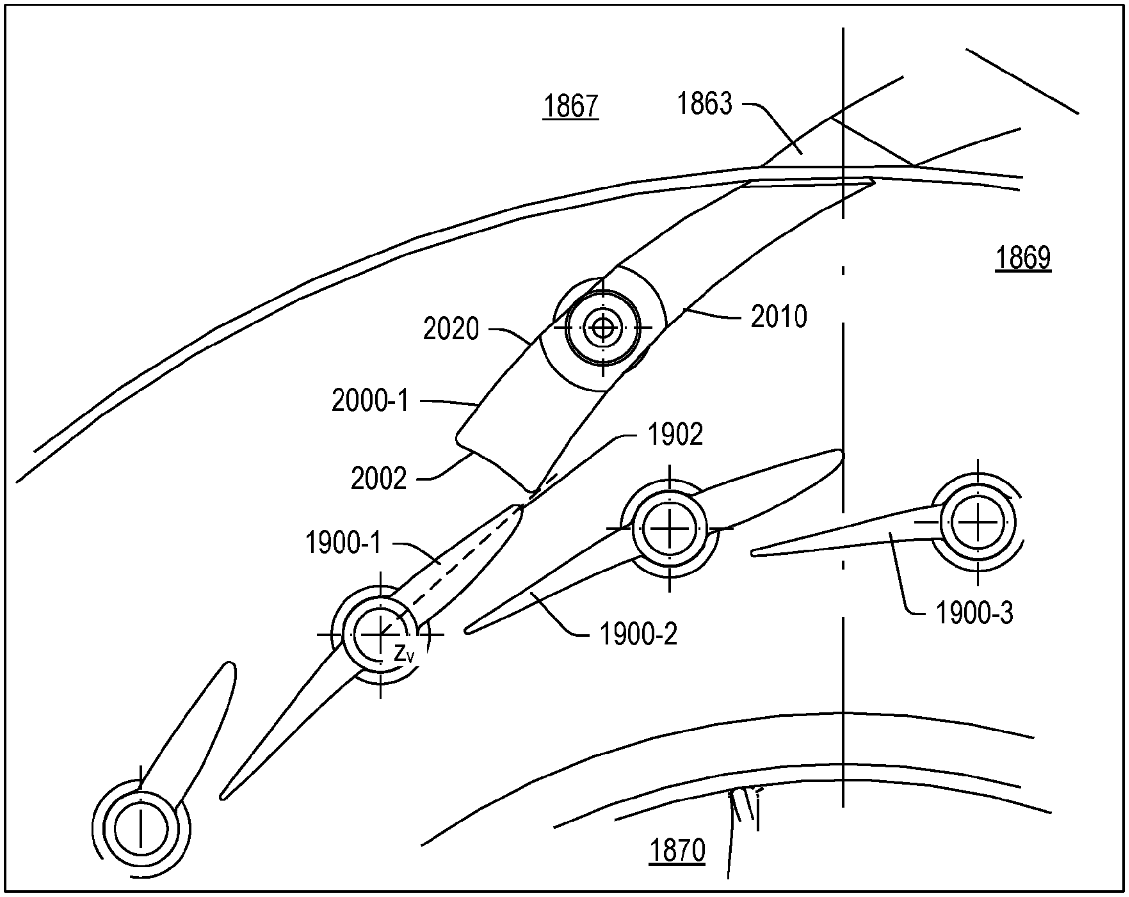
FIG. 16 shows an enlarged cutaway view of a portion of the assembly of FIG. 11.

FIGS. 14, 15 and 16 show enlarged views of portions of the assembly 1800 as shown in FIGS. 9, 10 and 11, respectively.

In the example of FIG. 14, the vane 1900-1 is shown as including a leading edge 1902, a trailing edge 1904, an upper surface 1906, a lower surface 1908 (hidden), a pressure airfoil side 1910 and a suction airfoil side 1920. In such an example, the airfoil sides 1910 and 1920 extend between the leading and trailing edges 1902 and 1904. The vane 1900-1 is also shown as including a post 1960 that defines a pivot axis $z_v$ of the vane 1900-1. As explained, the vane 1900-1 can be pivotable in a clockwise direction or a counter-clockwise direction about its pivot axis $z_v$.

In the example of FIG. 14, the vane 1900-1 is pivoted to a position where the leading edge 1902 can form a substantially continuous between the airfoil surfaces 2020 and 1920, albeit with a clearance between the leading edge 1902 of the vane 1900-1 and the trailing surface 2002 of the flow body 2000-1. Further, as shown, the airfoil surface 2010 of the flow body 2000-1 can provide for a throat with respect to the vane 1900-2, where the throat extends to the airfoil surface 1910 of the vane 1900-1. As to the clearance between the leading edge 1902 of the vane 1900-1 and the trailing surface 2002 of the flow body 2000-1, it can be sufficiently small such that a substantial amount of exhaust gas flow does not occur in the clearance between exhaust gas of the exhaust gas channels 1867 and 1869.

In the example of FIG. 14, the vane 1900-1 can be defined to be at a pivot angle of approximately 69 degrees, as defined by a dashed line from the pivot axis $z_v$ to the leading edge 1902. As shown, the dashed line may be tangent or otherwise proximate to an end of the trailing surface 2002 of the flow body 2000-1. As shown, the end can be between the trailing surface 2002 and the airfoil surface 2020.

As shown in the example of FIG. 14, the vanes 1900-1, 1900-2 and 1900-3, etc., have a pivot axis 1960 that is located between the leading edge 1902 and the trailing edge 1904. In such an example, a distance from the pivot axis 1960 to the leading edge 1902 can be approximately the same as a distance from the pivot axis 1960 to the trailing edge 1904. As an example, such distances may be defined by a ratio or by one or more percentages. For example, in FIG. 14, the distance from the pivot axis 1960 to the trailing edge 1904 is slightly greater than the distance from the pivot axis 1960 to the leading edge 1902. As an example, a distance from a pivot axis of a vane to a leading edge can be at least 40 percent of a distance from the pivot axis of the vane to a trailing edge. In the example of FIG. 14, the distance from the pivot axis 1960 to the leading edge 1902 is greater than approximately 60 percent, greater than approximately 70 percent and greater than approximately 80 percent of the distance from the pivot axis 1960 to the trailing edge 1904. If a vane did not include a leading edge disposed a distance from a post region of the vane, the leading edge would not sweep an arc of a circle upon pivoting about a pivot axis; rather, it would remain confined to a radius of the post region.

As explained, the distance from the pivot axis 1960 to the leading edge 1902 can define an arc of a circle when the vane 1900-1 is pivoted about its pivot axis 1960 (see dashed circle). In such an approach, the circle can have a radius that is larger than a radius of a post region (see dotted circle). As an example, in FIG. 14, a circle drawn around the leading edge 1902 may have a radius that is at least three times a radius of the post region of the vane 1900-1. For example, in FIG. 14, the radius of a circle drawn around the leading edge 1902 (dashed circle) and centered on the pivot axis 1960 is approximately 4 to 5 times the radius of a circle drawn around the post region of the vane 1900-1 (dotted circle).

As shown in FIG. 14, the vane 1900-1 has an airfoil shape where its length is greater than its width. As to the trailing surface 2002 of the flow body 2000-1, as explained, it can be defined to overlap the leading edge 1902 of the vane 1900-1 for a portion of a range of pivot angles and to not overlap for various angles outside of that range (see, e.g., FIG. 17).

FIG. 15 shows the vane 1900-1 in a different position than in the example of FIG. 14. In the example of FIG. 15, the vane 1900-1 can be defined to be at a pivot angle of approximately 54 degrees, as defined by a dashed line from the pivot axis zv to the leading edge 1902. As shown, the dashed line may be between ends of the trailing surface 2002 of the flow body 2000-1.

FIG. 16 shows the vane 1900-1 in a different position than in the example of FIG. 15. In the example of FIG. 16, the vane 1900-1 can be defined to be at a pivot angle of approximately 42 degrees, as defined by a dashed line from the pivot axis zv to the leading edge 1902. As shown, the dashed line may be tangent or otherwise proximate to an end of the trailing surface 2002 of the flow body 2000-1. As shown, the end can be between the trailing surface 2002 and the airfoil surface 2010.

In the examples of FIGS. 14, 15 and 16, the pivot angle ranges from approximately 69 degrees to approximately 42 degrees, which is an angular pivot span of approximately 27 degrees. As explained, a closed position may be at yet a further amount of pivoting, for example, to a pivot angle of less than 42 degrees where, for example, vanes may contact. The examples of FIGS. 14, 15 and 16 represent an overlap range for an amount of pivoting of the vane 1900-1 where, for example, overlap can be defined by a radial line from a post or pivot axis of a vane and the leading edge of the vane. In such an example, a first marker of overlap can be in moving from open to lesser open and a second marker of overlap can be in moving from lesser open to more closed (e.g., or vice versa). As an example, an overlap range of pivot angles can be for a range that is less than an overall operational range of pivot angles. As an example, an overlap range of pivot angles can be closer to a closed end of a range of pivot angles than an open end of the range of pivot angles. For example, with reference to FIG. 14, counter-clockwise pivoting of the vane 1900-1 may be possible such that overlap does not occur where the vane 1900-1 is in a more open position. In such an example, consider a pivot angle of approximately 90 degrees (e.g., vertical in FIG. 14) such that the overlap range of pivot angles of approximately 69 degrees to approximately 42 degrees is closer to the closed position of the vane 1900-1 than to the fully open position of the vane 1900-1 (e.g., approximately 90 degrees). As to a fully closed position of the vane 1900-1, with reference to FIG. 16, a pivot angle of approximately 30 degrees can be a position where contact may occur between the vane 1900-1 and the vane 1900-2 (e.g., where both pivot). In such an example, the lower range of the overlap being approximately 42 degrees is within 12 degrees of closed position, which may be contact position; whereas, the upper range of overlap being approximately 69 degrees is within 21 degrees of the example of 90 degrees for the fully open position, which may be defined by a vane trailing edge to turbine wheel blade clearance (e.g., approximately 1 percent to 10 percent of an outer radius of a turbine wheel). As an example, a fully open position of the vane 1900-1 may be less than approximately 90 degrees. For example, consider a fully open position that corresponds to a pivot angle of approximately 81 degrees. In such an example, a range of overlap may be substantially intermediate a fully open pivot angle and a fully closed pivot angle (e.g., approximately 12 degrees from fully open and approximately 12 degrees from fully closed or contacting).

Figure 17:
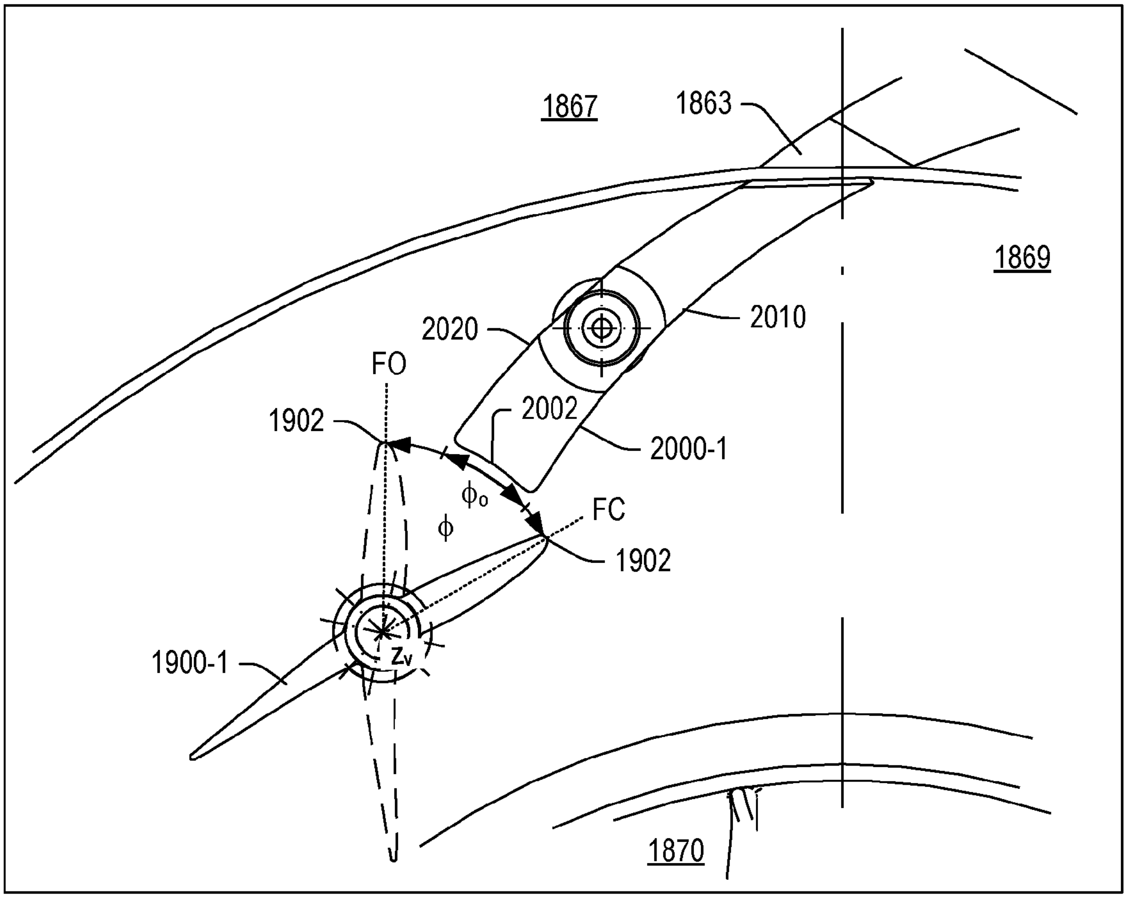
FIG. 17 shows a cutaway view of a portion of the assembly of FIG. 7.

FIG. 17 shows a plan view of a portion of the assembly 1800 along with a pivot angle range defined by a fully open position, FO, and a fully closed position, FC, which may be a vane-to-vane contact position. As shown, an overlap pivot angle range. can be within the pivot angle range—Further, the overlap pivot angle range can be a number of degrees from the FO position and can be a number of degrees from the FC position, where, for example, the number of degrees from the FC position may be less than the number of degrees from the FO position.

In the example of FIG. 17, the overlap pivot angle range can be a percentage of the pivot angle range. For example, consider the overlap pivot angle range as being 40 percent to 80 percent of the pivot angle range or, for example, as being 50 percent to 75 percent of the pivot angle range or, for example, as being 55 percent to 72 percent of the pivot angle range.

In various examples, wall ends may be or act as tongue extensions. Such wall ends may be symmetrically or asymmetrically positioned with respect to vanes (e.g., consider one set of vanes includes 10 vanes and another set of vanes includes 9 vanes, for a total of 19 vanes).

As explained, a closed position can define minimum flow conditions For example, vane-to-vane contact may not exist in the closed positions such that relatively small, narrow channels exist where some amount of flow may exist, which can be defined as minimum or minimal flow (e.g., for a given amount of pressure, etc.). Where contact does occur, some minimal flow may occur, for example, in clearances above and/or below vanes.

As explained, flow bodies may be part of a cartridge assembly (e.g., disposed between a plate portion and an insert portion of a cartridge assembly where vanes may also be positioned). As explained, vanes can be pivotable about their respective pivot axes where a relatively small clearance exists between two of the vanes and two respective flow bodies. For example, a flow body can include a side that is closest to a rotational axis of a turbine wheel as in a turbine wheel space (e.g., a central axis of a cartridge assembly) that may be radiused (e.g., curved) at least in part to account for a leading edge of a respective vane. which, as shown, while being a leading edge, it may not be directly exposed to incoming flow due to presence of the flow body. For example, a leading edge of a vane may allow for flow to be "divided" where a portion of the flow flows along one side of the vane and another portion of the flow flows along another, opposing side of the vane. In various examples, the presence of a flow body can to some extent block the leading edge such that incoming flow on one side of the flow body flows predominantly along one side of the corresponding vane and incoming flow on another side of the flow body flows predominantly along another, opposing side of the corresponding vane.

As an example, a flow body may be made of a material such as, for example, steel. As an example, a flow body may be made of a material that is the same as a vane material. In various examples, a flow body can be a fixed structure. For example, consider a fixed structure that is fixed in a cartridge assembly.

As explained, a side of a flow body (e.g., airfoil surface) can be defined at least in part via an arc, which may have an arc length defined as a distance and/or as a number of degrees. In such an example, the arc may be defined using a pivot axis of a vane. For example, consider drawing a circle about a vane where the circle is centered on the vane axis and where the side of the flow body is defined by at least a portion of the perimeter of the circle. In the closed position of vanes (e.g., closed position of the cartridge assembly), the vane that is at the flow body may form a relatively continuous curved surface with one side of the flow body and, for example, a curved surface may be defined with a gap on an opposing side of the flow body and a portion of the vane. A flow body may be contoured in a manner that can correspond to a pivotable vane.

As an example, exhaust gas flow can be substantially separated by a flow body for at least a portion of an entire travel of a corresponding vane and, for example, not beyond. In such an example, the flow bodies may be shaped in a manner that introduces minimal interference (e.g., only as be a may be required with respect to the end "arc" side, which can be dictated by one or more vane characteristics such as length to one side of a pivot axis, etc.). Such an approach may act to help separate the flow of two scrolls (e.g., volutes), which, as explained, can be from different cylinders of an internal combustion engine.

As an example, flow bodies can be identical such that only one piece needs to be manufactured. For example, consider manufacturing two identical pieces and inserting those two identical pieces into a cartridge assembly during assembly of the cartridge assembly where the cartridge assembly includes a number of pivotable vanes, which may be an odd number of vanes or, for example, an even number of vanes; noting that an odd number of vanes may be utilized in instances where, for example, flow of one scroll differs from flow in another scroll of a two scroll assembly.

As an example, a flow body may be contactless in that no vane contacts the flow body during operation of a variable nozzle cartridge assembly.

As an example, an assembly can include one or more features that can be defined using continuity as to a curve and/or a surface. For example, consider flow body to vane where the vane is pivotable about an axis and, for example, where the flow body is fixed and/or, for example, consider tongue to flow body to vane where the vane is pivotable about an axis and, for example, where the tongue and the flow body are fixed.

As explained, the flow field upstream of the vanes of turbo machinery is often not homogeneous. As such, it may be desirable to minimize the interference between portions of the stream, that are different in one or more of, for example, velocity vectors and fluid states.

Variable position guide vanes can be used to adapt the swallowing characteristic of turbine stages to different operating conditions of the turbo machine. As an example, it may be desirable to minimize the interference between two adjacent portions of a stream, bound to enter, at least partially, into two adjacent variable geometry nozzles, without changing the relative flow distribution between the two portions of the stream, at various or all possible positions of the movable vane.

As explained, shape of a flow body, that is located upstream of a movable guide vane, can be defined in a particular way. As explained, a trailing surface of a flow body can be defined at least in part by section of a circle, which can be defined at least in part using a leading edge of a vane. As explained, such a trailing surface can be a concave trailing surface where concavity of the trailing surface can accommodate the leading edge of a vane as the leading edge sweeps an arc responsive to being pivoted about a pivot axis of the vane.

As an example, a center of a circle can be the axis of a movable vane. In such an example, the radius of such a circle can be equal to the extension of the movable vane from the middle point of its axis to its trailing edge, plus a suitable clearance (e.g., consider a clearance of a few millimeters or less).

As an example, a sector of a circle (e.g., arc) can be equal to the portion of the circle that is travelled by the movable vane. As an example, such a sector may be shortened at either or both of the end positions of the movable vane. In such an example, such shortening (e.g., chamfering, etc.) can be desirable to allow a certain mixing of the flows, near the two respective end positions of the movable vane.

As an example, a sector may be prolonged at either or both of the end positions of a movable vane. In such an example, such an approach can help, for example, to minimize the effect of smaller movements of the vane on the flow.

In various instances, a vehicle may utilize one or more forms of non-wheel brake braking. For example, in heavy vehicles the engine is often made to provide extra braking power to take some strain off the vehicle's regular brake system and to help avoid overheating the brakes. For example, consider a butterfly valve that stops the exhaust flow, which may be referred to as an exhaust brake. Another form is compression release braking that may be utilized for large diesel trucks. Such braking operates by opening exhaust valves at the top of the compression stroke, so the large amount of energy stored in that compressed air is not returned to the crankshaft, but is released into the atmosphere. Normally, during the compression stroke, energy is used as the upward-traveling piston compresses air in the cylinder; the compressed air then acts as a compressed spring and pushes the piston back down. However, with the jake brake in operation, the compressed air is suddenly released just before the piston begins its downward travel. This sudden release of compressed air creates audible sound waves similar to the expanding gases escaping from the muzzle of a firearm. Having lost the energy stored within the compressed air, there is no "spring back" so the engine must expend yet more energy pulling the piston back down again. Such braking can be effective and create substantial amounts of braking force (e.g., a 565 hp (421 kW) diesel engine can produce up to 600 hp (450 kW) of braking power at 2,100 RPM).

As an example, a flow body (e.g., an object) may be shaped to help with one or more of various conditions. As an example, an ideal may be perfect flow separation over an entire range of operational conditions. However, conditions such as engine related braking can alter pulsations. Where pulsations are strong, a gap (e.g., a clearance) between a flow body and a corresponding vane can help to reduce the impact of strong pulsations in the closed position of the cartridge assembly, which may otherwise be strong enough to overload a vane adjustment mechanism, which may thereby cause one or more control problems when trying to maintain a particular position of vanes (e.g., a closed position, which may be a minimum flow position, etc.). Such an approach may help to increase the operational life of a variable geometry turbocharger. And, as explained, where the vanes are open, a flow body may provide for more flow separation as the open channels formed between the vanes can allow for flow to a turbine wheel to "release" and/or "even" pulsation pressures.

Figure 18:
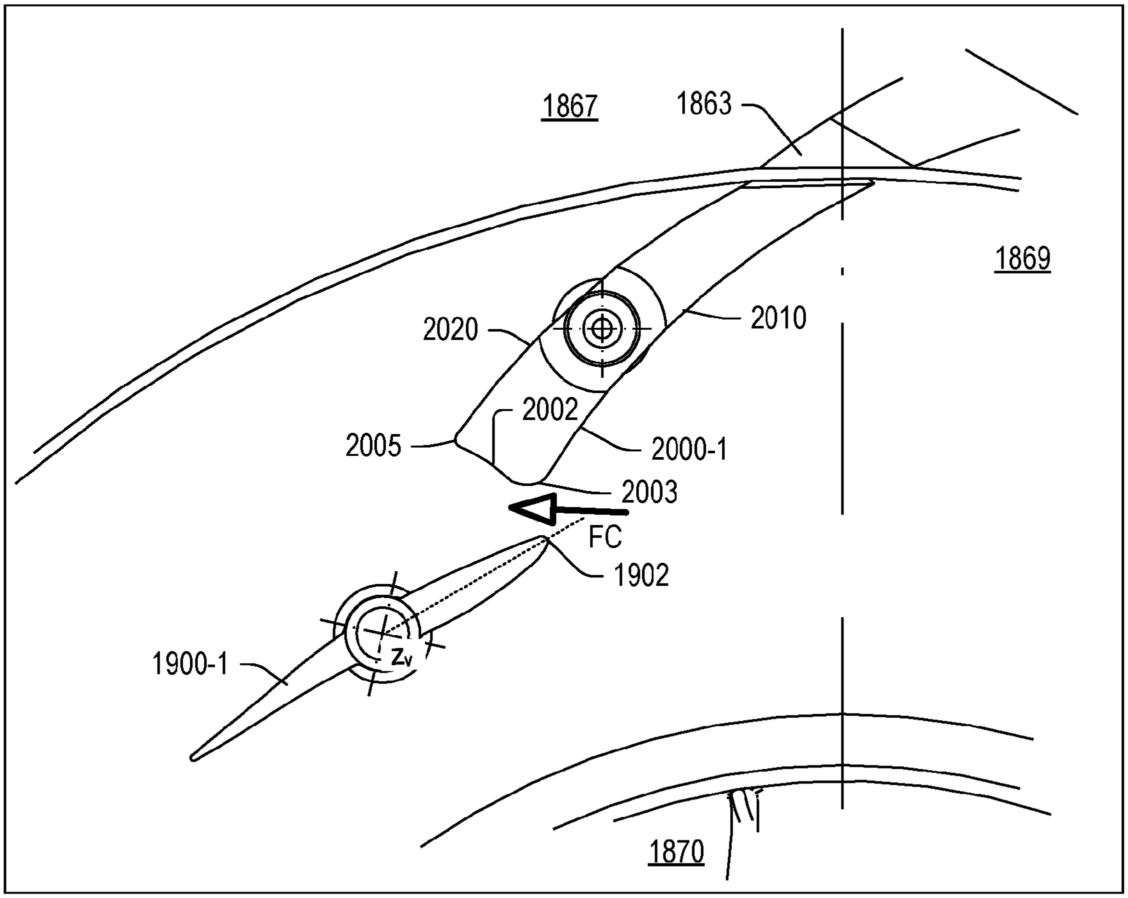
FIG. 18 shows a cutaway view of a portion of the assembly of FIG. 7 with an example of a flow body.

FIG. 18 shows an example of a portion of the assembly 1800 where the flow body 2000-1 includes ends 2003 and 2005 of the trailing surface 2002 where the ends 2003 and 2005 differ. For example, the end 2003 can be truncated (e.g., chamfered, etc.) to provide for an increased amount of clearance when compared to the example of FIG. 17.

Figure 19:
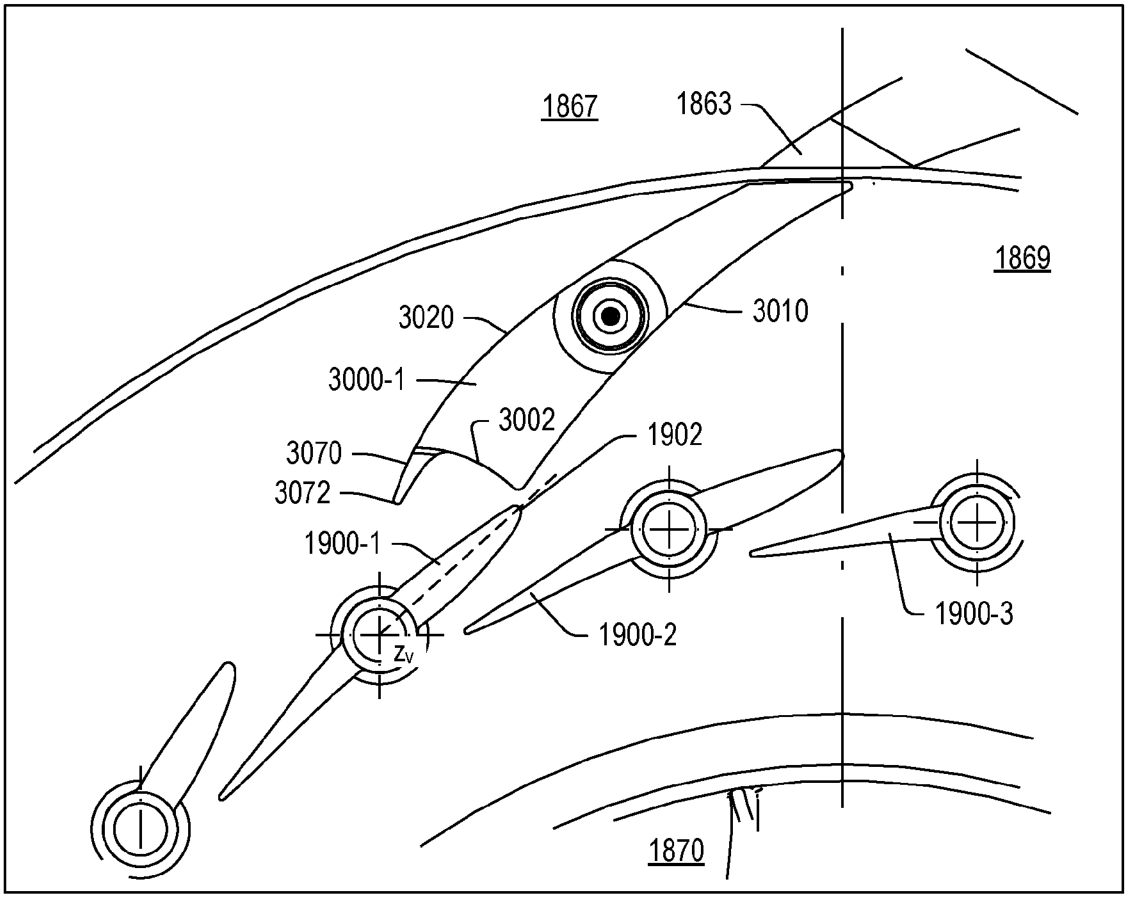
FIG. 19 shows an enlarged cutaway view of a portion of the assembly of FIG. 11 with an example of a flow body that includes an extension.

FIG. 19 shows an enlarged view of a portion of the assembly 1800 as shown in FIGS. 9, 10 and 11, respectively, however, with a flow body 3000-1. In the example of FIG. 19, the vane 1900-1 is pivoted to a position where the leading edge 1902 can form a substantially continuous transition between the airfoil surfaces 3010 and 1910, albeit with a clearance between the leading edge 1902 of the vane 1900-1 and a trailing surface 3002 of the flow body 3000-1.

In the example of FIG. 19, the flow body 3000-1 is shown with labels that are akin to those utilized to describe various features of the flow body 2000 (e.g., the flow body 2000-1). However, the flow body 3000-1 also includes an extension 3070 at the trailing surface 3002 (e.g., a trailing end) that includes a tip 3072. As shown, the extension 3070 can be an extension of the airfoil surface 3020 of the flow body 3000-1. The flow body 3000-1 can, via the extension 3070, limit pivoting of the vane 1900-1 and, for example, a set of vanes where the vanes are mechanically coupled. When the vane 1900-1 is rotated counter-clockwise in the view of FIG. 19, the leading edge 1902 will be seated approximately in a pocket formed by the trailing surface 3002 and an surface of the extension 3070, where an opposing surface of the extension 3070 can form a substantially continuous transition between the airfoil surface 3020 and the airfoil surface 1920 of the vane 1900-1. The vane 1900-1 may be limited in its rotational (e.g., pivot) angle range in a clockwise direction and/or a counter-clockwise direction.

Figure 20:
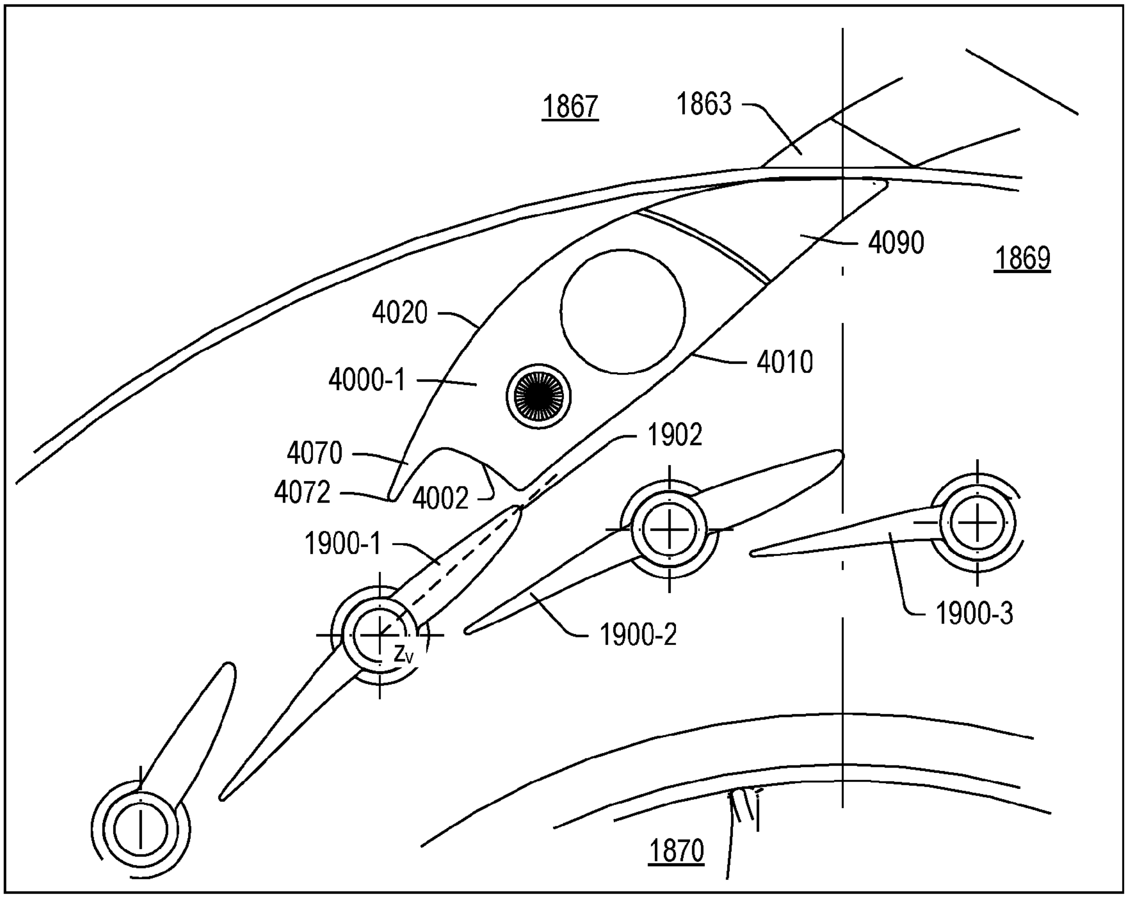
FIG. 20 shows an enlarged cutaway view of a portion of the assembly of FIG. 11 with an example of a flow body that includes an extension and/or a spacer.

FIG. 20 shows an enlarged view of a portion of the assembly 1800 as shown in FIGS. 9, 10 and 11, respectively, however, with a flow body 4000-1. In the example of FIG. 20, the vane 1900-1 is pivoted to a position where the leading edge 1902 can form a substantially continuous transition between the airfoil surfaces 4010 and 1910, albeit with a clearance between the leading edge 1902 of the vane 1900-1 and a trailing surface 4002 of the flow body 4000-1.

In the example of FIG. 20, the flow body 4000-1 is shown with labels that are akin to those utilized to describe various features of the flow body 2000 (e.g., the flow body 2000-1). However, the flow body 4000-1 also includes an extension 4070 at the trailing surface 4002 (e.g., a trailing end) that includes a tip 4072. As shown, the extension 4070 can be an extension of the airfoil surface 4020 of the flow body 4000-1. The flow body 4000-1 can, via the extension 4070, limit pivoting of the vane 1900-1 and, for example, a set of vanes where the vanes are mechanically coupled. When the vane 1900-1 is rotated counter-clockwise in the view of FIG. 20, the leading edge 1902 will be seated approximately in a pocket formed by the trailing surface 4002 and an surface of the extension 4070, where an opposing surface of the extension 4070 can form a substantially continuous transition between the airfoil surface 4020 and the airfoil surface 1920 of the vane 1900-1. The vane 1900-1 may be limited in its rotational (e.g., pivot) angle range in a clockwise direction and/or a counter-clockwise direction.

In the example of FIG. 20, the flow body 4000 also includes a discrete spacer 4090 that does not extend to the trailing surface 4002. In the example of FIG. 20, the spacer 4090 may be shaped and/or sized to provide for a desired transition of flow from the tongue 1863 into the vane space. As an example, the spacer 4090 may be stepped or form a step in an axial direction, which is a direction of a rotational axis of the turbine wheel 1870. As an example, the spacer 4090 can have an axial span and the tongue 1863 can have an axial span where the axial spans may be selected to provide a desired transition of flow from the tongue 1863 into the vane space. As an example, the spacer 4090 may act as an extension of the tongue 1863 that extends a distance into the vane space to provide for more optimal flow in the vane space.

Figure 21:
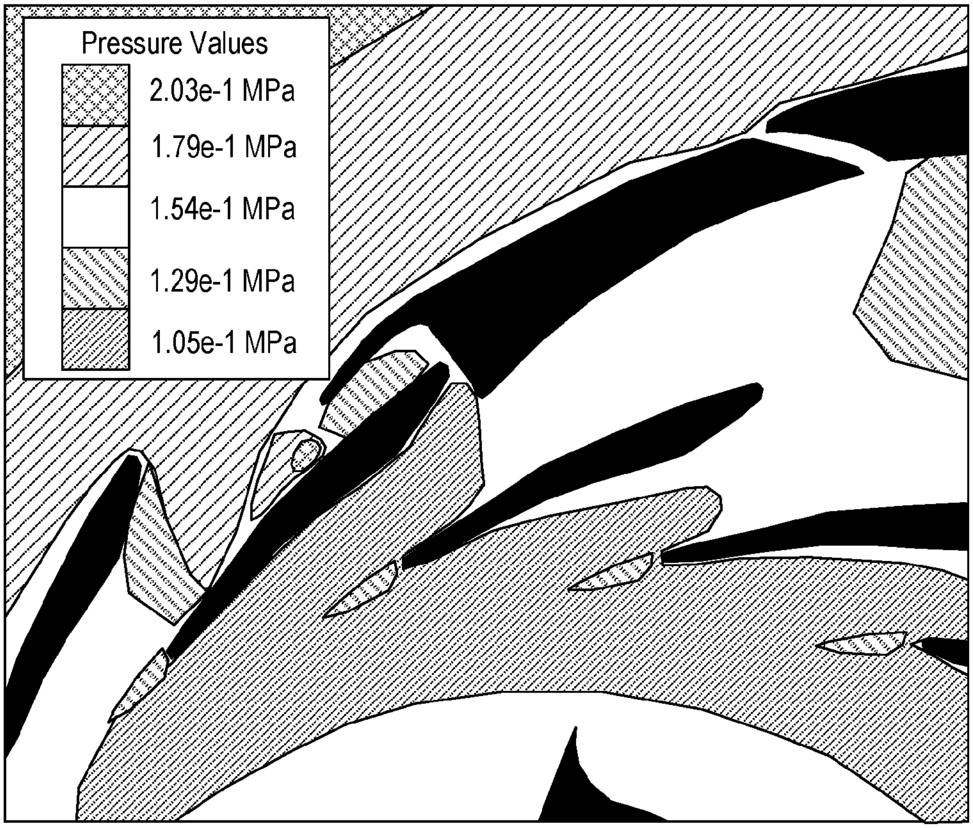
FIG. 21 shows an example of a plot of a computational fluid dynamics simulation of an example of an assembly.

FIG. 21 shows a plot 21100 of pressure for a portion of an assembly that includes a flow body with an extension. In the plot 21100, physical components are illustrated in solid black while pressure contours are illustrated using cross-hatching and solid white. As shown, an extension can provide for tailoring of pressures for flow into a vane space where a twin scroll is utilized. While the plot 21100 shows a single flow body at a single tongue, the assembly can include an additional flow body at another tongue; noting that where more than two scrolls are utilized, a corresponding number of flow bodies may be provided for a corresponding number of tongues. As shown in the plot 21100, pressure can be high on a flow side of the extension where flow can be driven into throats defined by adjacent vanes. As an example, the extension of the flow body can help to smooth flow into a throat that is defined by a vane that includes a leading edge that sits in a pocket of the flow body and another vane that is adjacent and has a leading edge that is in a free flow stream that flows from an inlet flow side of the tongue. Such an approach can help to shape flow, for example, by providing an extended barrier to flow via effectively extending the tongue by the flow body where the flow body includes an extension that may be at a radius that is within an outermost radius defined by the leading edges of the vanes. As an example, a flow body with an extension can have a flow body thickness and an extension thickness as shown in the plot 21100 where the extension thickness is less than the flow body thickness (e.g., 50 percent less, 40 percent less, 30 percent less, 20 percent less, etc.).

As an example, a relatively thin extension of a flow body can provide for shaping flow without introducing considerable mass to the flow body, while the relatively thin extension may be thick enough to provide for structural integrity, for example, to withstand flow, high temperatures, possible vane contact, etc. As shown in the plot 21100, if vane contact does occur between the leading edge of the vane in the pocket of the flow body, it may contact the extension at or near the juncture between the flow body and the extension, which can provide sufficient integrity. As an example, an extension of a flow body may have a substantially constant thickness or may become thinner in moving from the juncture to the tip of the extension.

Figure 22:
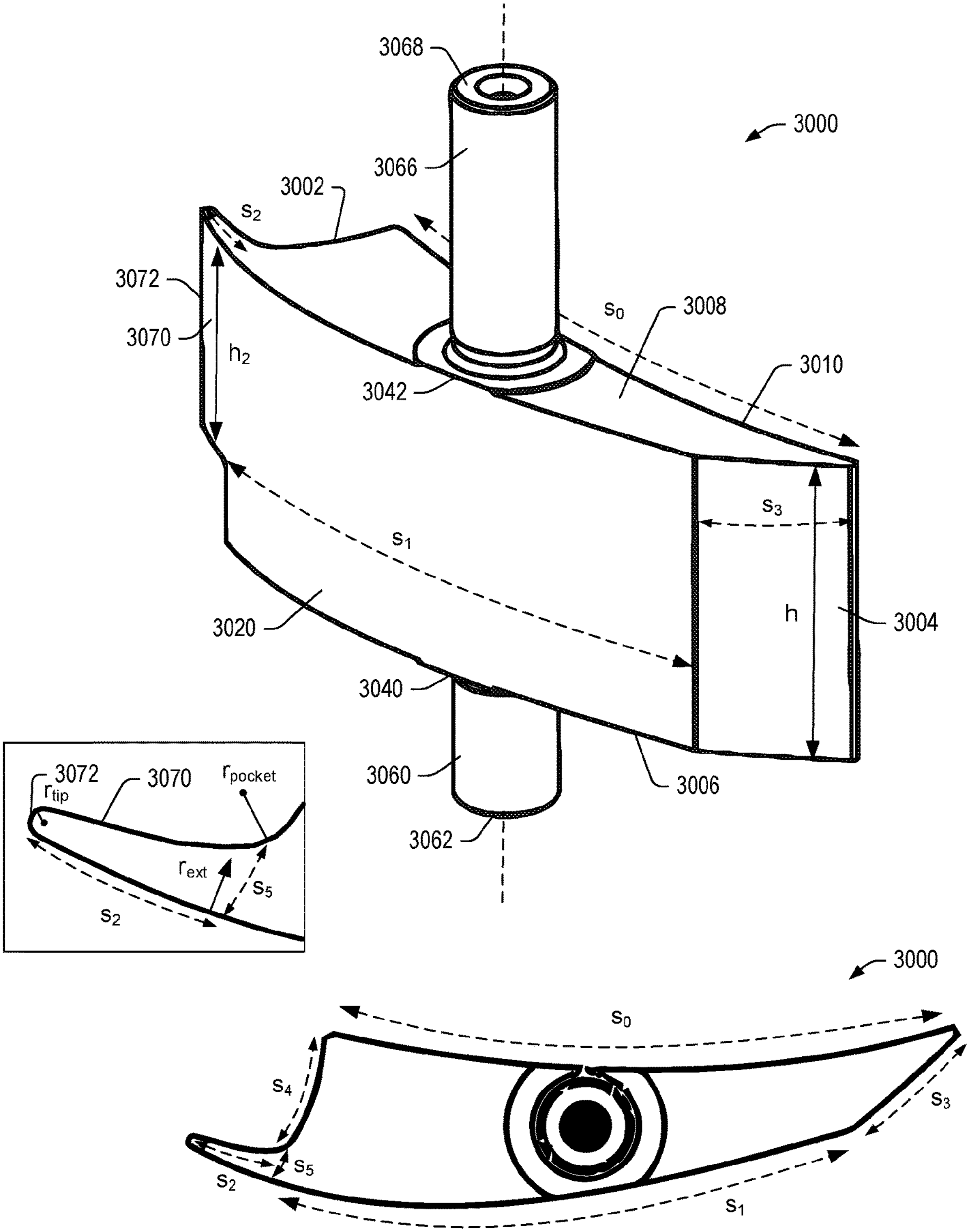
FIG. 22 shows a series of views of an example of a flow body.

FIG. 22 shows an example of the flow body 3000 in a perspective view and a plan view with an enlarged plan view of a portion of the flow body 3000; noting that a cross-sectional view may include a portion that may appear similar to the cross-sectional view of the flow body 2000 as in FIG. 13; however, noting that the flow body 3000 includes the extension 3070. As shown, the flow body 3000 can include a concave trailing surface 3002 and a leading surface 3004, an upper surface 3006 and a lower surface 3008, opposing airfoil surfaces 3010 and 3020, a boss 3040 and a post 3060, which includes a post end 3062 and another boss 3042 and another post 3066, which includes a post end 3068. As shown, the boss 3040 and/or the boss 3042 may be shaped as a truncated cylinder and be slightly elevated above the upper surface 3006 such that the boss 3040 acts as a spacer, for example, to provide an axial clearance between components of the assembly 1800.

In the example of FIG. 22, the flow body 3000 can be defined by an axial height, h, where the extension 3070 can be of a lesser axial height, h2, which may match a vane height (e.g., a vane height may be approximately equal to an extension height).

As shown, various spans so, $s_1$, $s_2$, $s_3$, $s_4$ and $s_5$ can be used to define the flow body 3000. As an example, an overall span or arc length of the low body 3000 may be defined by a sum of so and $s_2$, the atter of which corresponds to a span of the extension 3070. As shown, a span $s_3$ can correspond to a span of the leading surface 3004. As to the extension 3070, it may be defined in part by the span $s_2$ and a span $s_5$, along with one or more radii. For example, consider a radius $r_{tip}$ at a tip 3072 of the extension 3070, which may provide for streamlined flow in transitioning from the extension 3070 to a vane. As explained, the extension 3070 can form a pocket with the surface 3002 where, for example, the pocket may have a bend (e.g., curve) defined at least in part by a radius $r_{pocket}$. As explained, the surface 3020 may be defined by one or more radii where, for example, the extension 3070 along the span s2 may be defined at least in part by a radius rex1.

As an example, the span $s_4$ can be greater than the span $s_5$ and, for example, the span $s_2$ may be at least 50 percent of the span $s_4$ and a fraction of the span $s_1$. As an example, the span $s_5$ and the radius $r_{tip}$ may define thicknesses of the extension 3070 in that $s_5$ is greater than $r_{tip}$ and that the extension 3070 tapers from ss to the tip 3072. As an example, ss can be greater than twice $r_{tip}$.

As an example, various spans, radii, etc., may be specified in suitable units such as, for example, millimeters. As an example, a turbine wheel may have an outermost diameter that is within a range from 30 mm to 150 mm. As an example, a flow body may be sized proportionately to a turbine wheel and similarly so may vanes. As shown in various drawings, a vane can have a length that is less than an outermost diameter of a turbine wheel. Similarly, a flow body may have a length that is less than an outermost diameter of a turbine wheel. As an example, a flow body may have a length that can be compared to a length of a vane. For example, consider a flow body that has a length within a range of 0.5 to 2 times the length of a vane or, for example, within a range of 0.6 to 1.5 times the length of a vane. As an example, where a flow body includes an extension, the flow body may be longer than a flow body without an extension such that the length of the flow body may be a larger fraction of a vane length or, for example, greater than a vane length, however, generally less than 2 times a vane length. As explained with respect to FIG. 21, a flow body and vanes may be tailored for purposes of achieving desirable flow profiles (e.g., pressure contours, etc.).

As an example, the height of the flow body 3000 may be greater at the leading surface 3004 than the height at the trailing surface 3002. For example, the height at the leading surface 3004 may be selected to substantially match the height of a wall end.

As to the airfoil surfaces 3010 and 3020, they may be defined using a radius or radii or, for example, spans (e.g., as arc lengths, etc.). For example, FIG. 13 shows a radius R1 and a radius R2 that can define the airfoil surfaces 2010 and 2020, respectively. Similar parameters may be utilized to define the airfoil surfaces 3010 and 3020. The trailing surface 3002 of the flow body 3000 may be defined in part by a radius Rve, which can be based on an arc of a leading edge of a vane. For example, consider the radius Rve as being defined by an arc swept by pivoting motion of a leading edge of a vane, R1e, plus a clearance amount, which may be a percentage of $R_{1e}$ (e.g., from 0.1 percent to 25 percent). As explained, where an extension is present, a pocket may be defined in part by a radius (see, e.g., $r_{pocket}$) or another geometric metric (e.g., a corner, etc.).

As shown in the example of FIG. 22, the trailing surface 3002 can include a concavity where the concavity may be defined in part by an arc of a circle. As explained, such a trailing surface can be referred to as a concave trailing surface where, for example, a pocket for a leading edge of a vane may be formed in combination with the extension 3070, which extends to a tip 3072. As an example, a test for concavity may be to draw a line between two points in a body where if the line crosses a boundary of the body (e.g., a surface of the body), the body can be defined as being concave (e.g., as including a concavity) such as having a concave surface. As to the leading surface 3004, it may be defined by a radius $R_{se}$, which can depend on the shape of a well end. As an example, the leading surface 3004 may be a convex leading surface or a flat leading surface. For example, if a line is drawn between ends of the leading surface 3004, the leading surface 3004 is not concave if the line does not cross the leading surface 3004. As explained with respect to the trailing surface 3002, if a line is drawn between ends of the trailing surface 3002 (e.g., which may include an end at the tip 3072), the line is at least in part outside the flow body 3000 such that the trailing surface 3002 is a concave trailing surface. As an example, the trailing surface 3002 may be defined to be concave via a concave arc shape that effectively forms an indented trailing surface 3002 (e.g., indented into the flow body 3000). As an example, a convex arc shape can form a bulging surface (e.g., a convex surface). As an example, a flow body can include a trailing surface that includes a concavity that may be disposed between ends of the trailing surface where one or both of the ends may be radiused and/or chamfered. As an example, the tip 3072 can be radiused (e.g., defined by a radius of curvature; see, e.g., $r_{tip}$). As to a radiused end, it may be defined as being convex. For example, consider a concave portion of a trailing surface disposed between convex radiused ends of the trailing surface such that the trailing surface can be defined as being a concave trailing surface (e.g., a trailing surface with concavity that can accommodate a leading edge of a vane as it sweeps an arc responsive to pivoting about a pivot axis).

As an example, the extension 3070 of the flow body 3000 can be of a desired length (see, e.g., the span $s_2$) and can be a height (see, e.g., the height $h_2$) that may be constant or that may vary. As to the length, it can be sufficiently long to overlap a portion of a vane to form, for example, a labyrinth type of arrangement that can help to impede flow. As an example, a length of an extension can be in a range that may be less than or equal to a distance between a leading edge of a vane and a pivot axis of the vane. As explained, an extension can form a pocket that can receive a portion of a vane, where the extension can define a limit as to angular rotation of the vane, which may or may not contact the extension. An extension of a flow body can overlap a portion of a vane to form a labyrinth type of seal that hinders flow and to form a relatively continuous airfoil surface with the flow body. As an example, in combination, both aspects can help to direct exhaust flow properly to a turbine wheel (e.g., reduce undesirable leakage and improve transition of flow from along a flow body to along a vane). As an example, an extension of a flow body can improve throat fluid dynamics for a throat that is defined in part between two vanes where one of the vanes may be partially covered by the extension.

As an example, an overlap between an extension of a flow body and a portion of a vane can be defined with respect to an intended direction of flow of exhaust. For example, exhaust can flow over a surface of a flow body and transition to flowing over a portion of a vane where an extension of the flow body covers another portion of the vane, which includes a leading edge of the vane. In such an example, the vane can be pivotable about a pivot axis where pivoting may move the leading edge of the vane away from the extension (see, e.g., FIG. 19 and FIG. 24). In various examples, an extension of a flow body can direct flow in a manner such that flow is directed to an airfoil surface of a vane rather than to a leading edge of a vane. In various examples, a flow body includes an extension on one side, for one of its opposing airfoil surfaces, noting that, as an example, a flow body may include more than one extension.

As to an end of an extension, as an example, it may be vertical in a direction of a rotational axis of a turbine wheel. As an example, an end of an extension may be slanted, curved, etc. For example, consider a scalloped shape where an extension is longer at top and bottom and curved between to a shorter length or, for example, an extension may be longer at a position between top and bottom. As an example, an end of an extension may be tailored in shape (e.g., including length with respect to height) to achieve desirable flow transition between a flow body and a vane and/or to achieve desirable flow hindrance, for example, by formation of a labyrinth type of arrangement.

In the example of FIG. 22, a dashed line labeled s1 indicates a demarcation between height of the flow body 3000 at the extension 3070 (see, e.g., the height $h_2$) and not at the extension 3070; noting that the extension 3070 may be of the same height of the flow body 3000 and/or at a height that is different than that of the flow body 3000. In various examples, the height of the extension 3070 can be approximately equal to the height of a vane. As an example, the height of the extension 3070 at the tip 3072 may be approximately equal to the height of a vane, or it may be greater or lesser than a vane height. As shown in the plot of FIG. 21, pressures may be tailored along with flow through matching a height of an extension to height of a vane; noting that, as explained with respect to the flow body 4000, a spacer 4090 or spacer portion can be tailored to achieve desirable pressure and flow. In the example of FIG. 22, the dashed line may demarcate a spacer portion of the flow body 3000 that may be greater in height than the height of a vane. Such a spacer portion may be utilized to space apart components of an assembly, for example, at a vane space.

Figure 23:
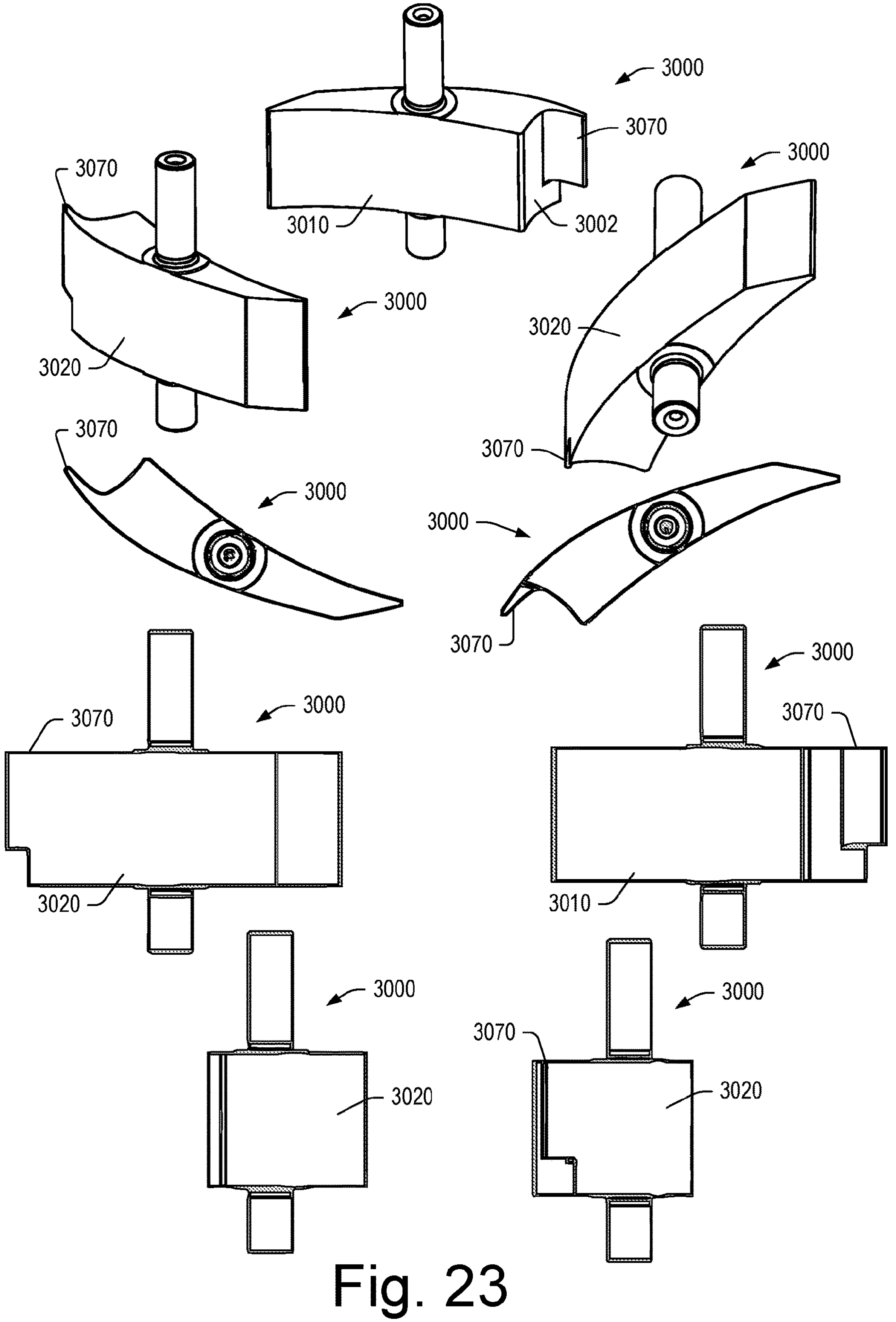
FIG. 23 shows a series of views of an example of a flow body.

FIG. 23 shows various views of the flow body 3000, which may be described with respect to one or more coordinate systems. In various views, the extension 3070 can be readily discerned as being an extension that extends outwardly from the trailing surface 3002 of the flow body 3000. In the topmost view, the extension 3070 is shown as having a height that is less than a height of the trailing surface 3002 where the extension 3070 forms part of the airfoil surface 3020. For example, the airfoil surface 3020 can be defined from the surface 3004 to the tip 3072 using an arc, a spline, etc., optionally with a desired type of continuity. For example, consider parametric curve continuity (e.g., CO, C1, etc.).

As an example, one or more surfaces may be described with respect to continuity such as, for example, GO geometric continuity where two curve segments join together; G1 geometric continuity where the direction of two segments' tangent vectors are equal at a join point; CO continuity where curves share the same point where they join; C1 continuity where tangent vectors of two segments are equal in magnitude and direction (share the same parametric derivatives); C2 continuity where curves share the same parametric second derivatives where they join. Such descriptions may be utilized with respect to a flow body; a vane; a flow body and a vane; a flow body and a tongue; a flow body, a vane and a tongue, etc.

Figure 24:
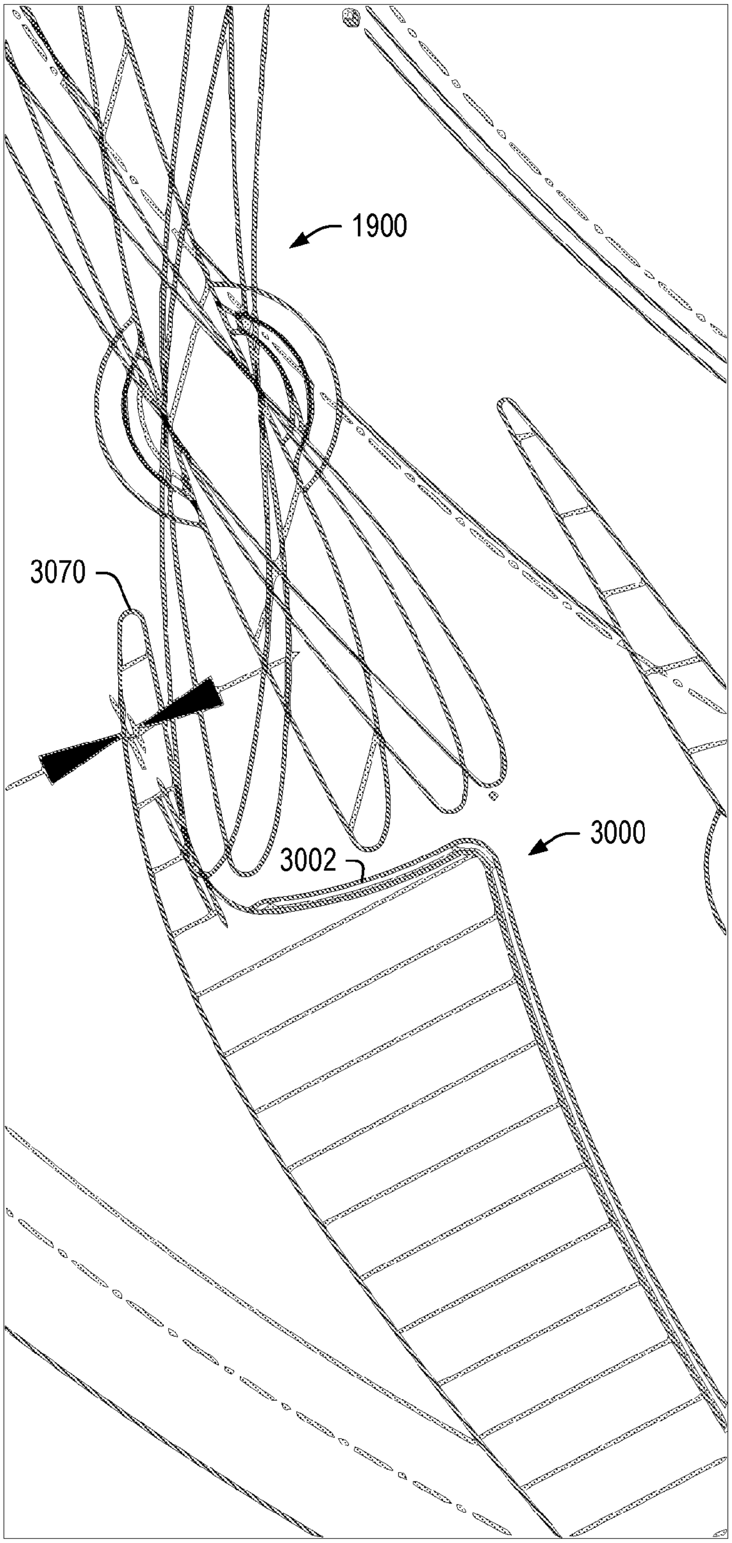
FIG. 24 shows a cutaway view of a portion of an example of an assembly.

FIG. 24 shows an example of a portion of an assembly where the vane 1900 is shown at various pivot angles with respect to the flow body 3000 that includes the extension 3070. In the example of FIG. 24, a clearance may be defined between a leading edge of the vane 1900 and the trailing surface 3002 of the flow body 3000 and optionally between the leading edge of the vane and the extension 3070 of the flow body 3000, the latter of which may be a non-contact clearance that is mechanically defined, for example, via a control mechanism of a set of vanes. As explained, a vane may be rotated over a range of angles with respect to a flow body where airfoil surfaces of the flow body and airfoil surfaces of a vane may have relatively "smooth" transitions, which may, for example, be defined using one or more continuity descriptions. Such transitions may act to reduce losses (e.g., pressure losses, energy losses, etc.) and/or may act to tailor pressure, velocity, flow rate, etc.

Figure 25:
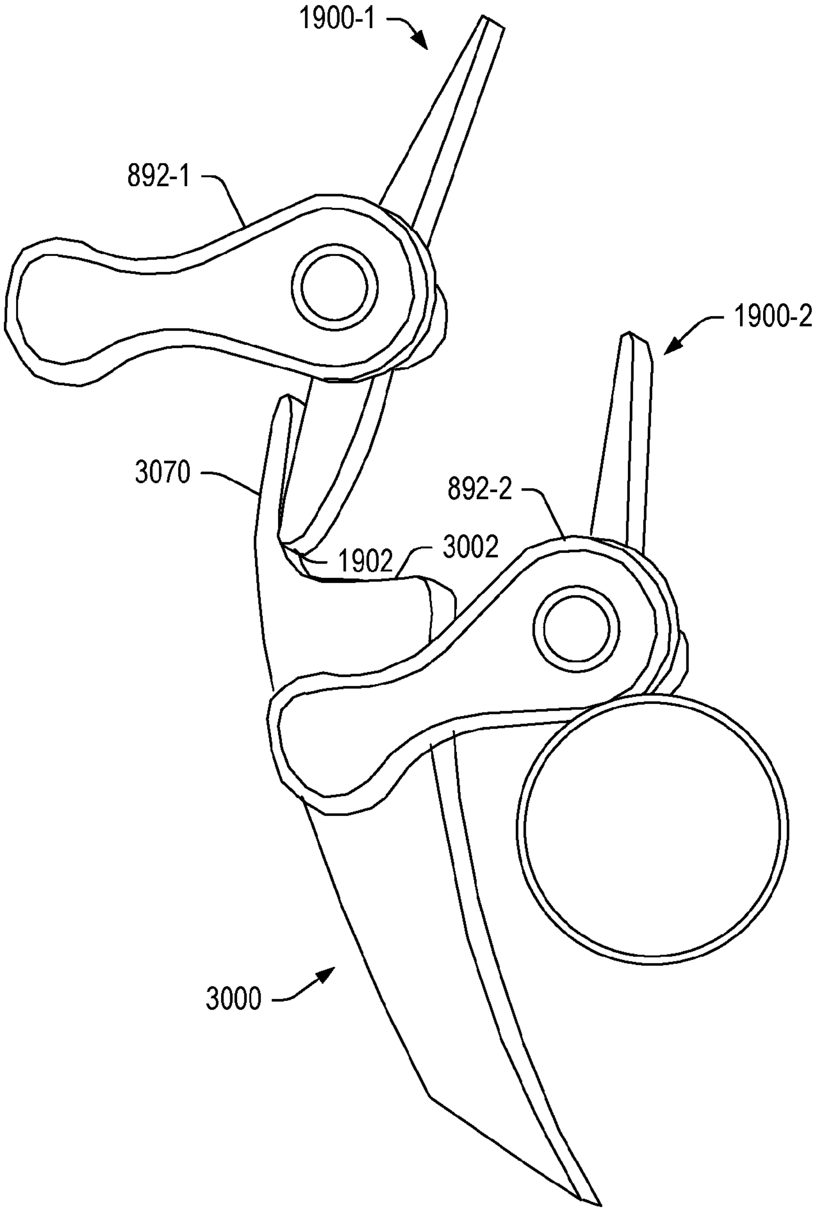
FIG. 25 shows a view of a portion of an example of an assembly.

FIG. 25 shows a portion of an assembly with a set of vanes 1900-1 and 1900-2 and the flow body 3000 that includes the extension 3070. The view of FIG. 25 is from a control side where control links 892-1 and 892-2 are shown as being coupled to a post of the vane 1900-1 and a post of the vane 1900-2, respectively. As explained with respect to FIG. 5, such control links can be part of a mechanism that provides for rotating of vanes in unison about their respective axes as aligned or defined by their respective vane posts. In FIG. 25, the vane 1900-1 is shown with its leading edge 1902 as being received in a pocket of the flow body 3000, as defined by the trailing surface 3002 and the extension 3070. As explained, if contact exists between the vane 1900-1 and the extension 3070, that contact may define a limit of rotation of more than the vane 1900-1. For example, as vanes can be coupled to a common mechanism for rotation, limiting rotation of one vane may limit rotation of all vanes. As an example, where an assembly includes more than one flow body such as, for example, more than one of the flow bodies 3000, each of the flow bodies may limit rotation of more than one vane. Where multiple sets of vanes are within an assembly, there may be a one-to-one correspondence between each set and each flow body such that each set of vanes is limited by a corresponding flow body.

Figure 26:
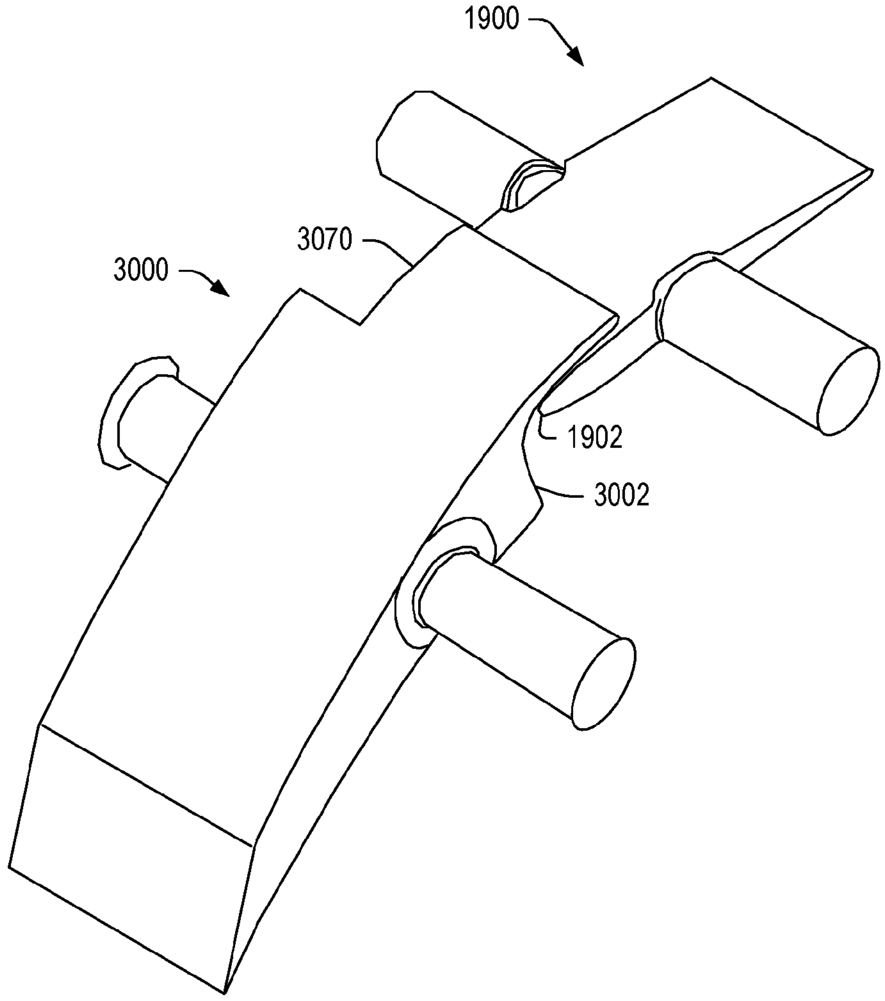
FIG. 26 shows a view of a portion of an example of an assembly.

FIG. 26 shows a portion of the assembly as in FIG. 25 with a set of vanes where flow body post axis is aligned with an axis of the one of the control components. As shown in FIGS. 25 and 26, the height of the extension of the flow body can be approximately equal to a vane height.

Figure 27:
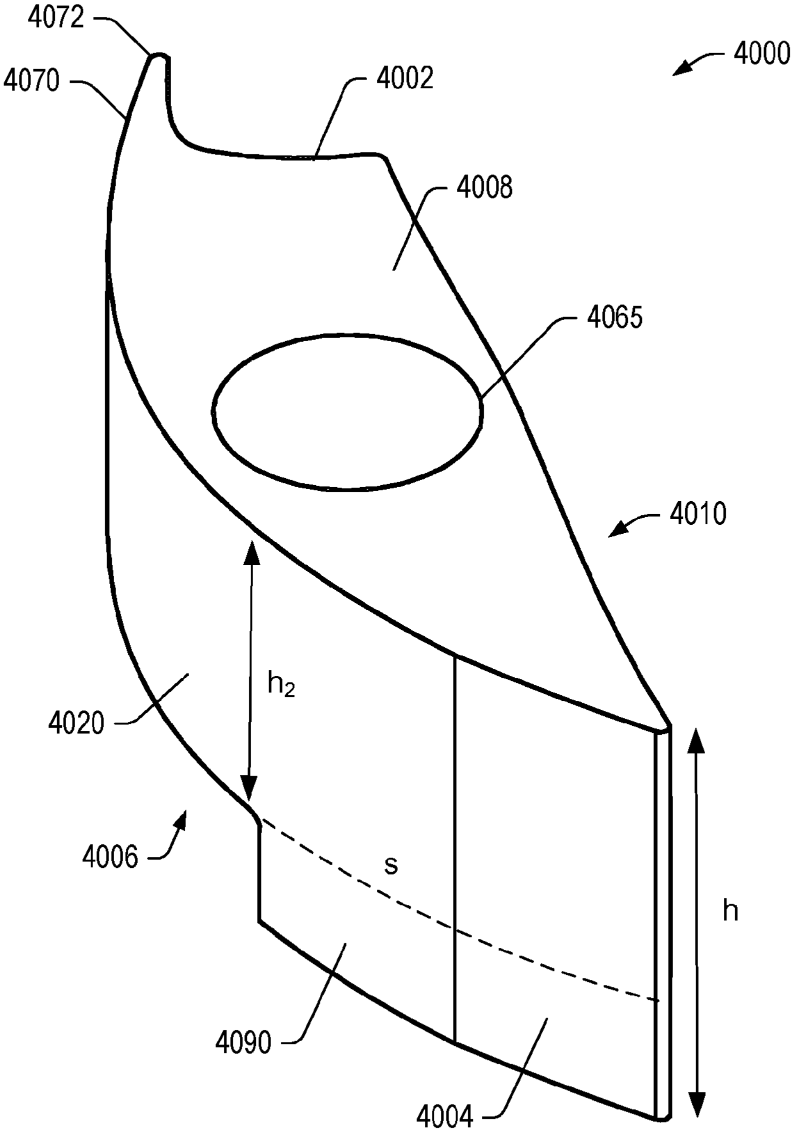
FIG. 27 shows a perspective view of an example of a flow body.

FIG. 27 shows an example of the flow body 4000 in a perspective view; noting that a cross-sectional view may be generated using one or more cutting planes. As an example, one or more of the dimensions shown with respect to the flow body 3000 may be utilized to describe one or more features of the flow body 4000. For example, various dimensions that may define the extension 3070 of the flow body 3000 may be utilized to define an extension 4070 of the flow body 4000.

As shown in FIG. 27, the flow body 4000 can include a concave trailing surface 4002 and a leading surface 4004, an upper surface 4006 and a lower surface 4008 (e.g., where upper and lower are defined with respect to the perspective), opposing airfoil surfaces 4010 and 4020, a bore 4065, and a spacer 4090, where the spacer 4090 is at an end of the flow body 4000 that includes the leading surface 4004 (e.g., a leading surface end). As shown in the example of FIG. 27, the spacer 4090 does not extend to the trailing surface 4002. The spacer 4090 (e.g., spacer portion) may, for example, provide an axial clearance between components of the assembly 1800. Various features, dimensions, etc., described with respect to the example flow body 3000 may be utilized to describe various features, dimensions, etc., of the flow body 4000 (e.g., consider shape, size, etc., of an extension, etc.).

In the example of FIG. 27, the flow body 4000 can be defined by an axial height, h2, where the spacer 4090 can be of a greater axial height, h; noting that the axial height, h2, may match a vane height (e.g., a vane height may be approximately equal to an extension height). As shown in the example of FIG. 27, the height of the flow body 4000 is greater at the leading surface 4004 than at the trailing surface 4002. For example, the height at the leading surface 4004 may be selected to substantially match the height of a wall end. In such an example, the height of the flow body 4000 at the spacer 4090 can be approximately equal to the height at a tongue (e.g., an end of a tongue as an end of a wall).

As to the airfoil surfaces 4010 and 4020, one or both of them may be defined using a radius or radii. For example, FIG. 13 shows a radius $R_1$ and a radius $R_2$ that can define the airfoil surfaces 2010 and 2020, respectively Similar parameters may be utilized to define the airfoil surfaces 4010 and/or 4020. The trailing surface 4002 may be defined in part by a radius $R_{ve}$, which can be based on an arc of a leading edge of a vane. For example, consider the radius $R_{ve}$ as being defined by an arc swept by pivoting motion of a leading edge of a vane, $R_{1e}$, plus a clearance amount, which may be a percentage of $R_{1e}$ (e.g., from 0.1 percent to 25 percent). In the example of FIG. 27, the spacer 4090 may be defined by a span, s, which may be an arc length, arc lengths, an arc length and a straight length, etc.

As shown in the example of FIG. 27, the trailing surface 4002 can include a concavity where the concavity may be defined in part by an arc of a circle. As explained, such a trailing surface can be referred to as a concave trailing surface. As an example, a test for concavity may be to draw a line between two points in a body where if the line crosses a boundary of the body (e.g., a surface of the body), the body can be defined as being concave (e.g., as including a concavity) such as having a concave surface. As to the leading surface 4004, it may be defined by a radius $R_{se}$, which can depend on the shape of a well end. As an example, the leading surface 4004 may be a convex leading surface or a flat leading surface. For example, if a line is drawn between ends of the leading surface 4004, the leading surface 4004 is not concave if the line does not cross the leading surface 4004. As explained with respect to the trailing surface 4002, if a line is drawn between ends of the trailing surface 4002 (e.g., which may include an end at the tip 4072), the line is at least in part outside the flow body 4000 such that the trailing surface 4002 is a concave trailing surface. As an example, the trailing surface 4002 may be defined to be concave via a concave arc shape that effectively forms an indented trailing surface 4002 (e.g., indented into the flow body 4000). As an example, a convex arc shape can form a bulging surface (e.g., a convex surface). As an example, a flow body can include a trailing surface that includes a concavity that may be disposed between ends of the trailing surface where one or both of the ends may be radiused and/or chamfered. As an example, the tip 4072 can be radiused. As to a radiused end, it may be defined as being convex. For example, consider a concave portion of a trailing surface disposed between convex radiused ends of the trailing surface such that the trailing surface can be defined as being a concave trailing surface (e.g., a trailing surface with concavity that can accommodate a leading edge of a vane as it sweeps an arc responsive to pivoting about a pivot axis).

As an example, the extension 4070 of the flow body 4000 can be of a desired length and can be of a height that may be constant or that may vary. In the example of FIG. 27, a dashed line indicates a demarcation between height of the flow body 4000 at the extension 4070 and at the spacer 4090; noting that the extension 4070 may be of the same height of the flow body 4000 and/or at a height that is different than that of the flow body 4000. In various examples, the height of the extension 4070 can be approximately equal to the height of a vane. As an example, the height of the extension 4070 at the tip 4072 may be approximately equal to the height of a vane, or it may be greater or lesser than a vane height. As shown in the plot of FIG. 21, pressures may be tailored along with flow through matching a height of an extension to height of a vane. As explained with respect to the flow body 4000, a spacer 4090 or spacer portion can be tailored to achieve desirable pressure and flow. In the example of FIG. 27, the dashed line may demarcate a spacer portion of the flow body 4000 that may be greater in height than the height of a vane. Such a spacer portion may be utilized to space apart components of an assembly, for example, at a vane space.

Figure 28:
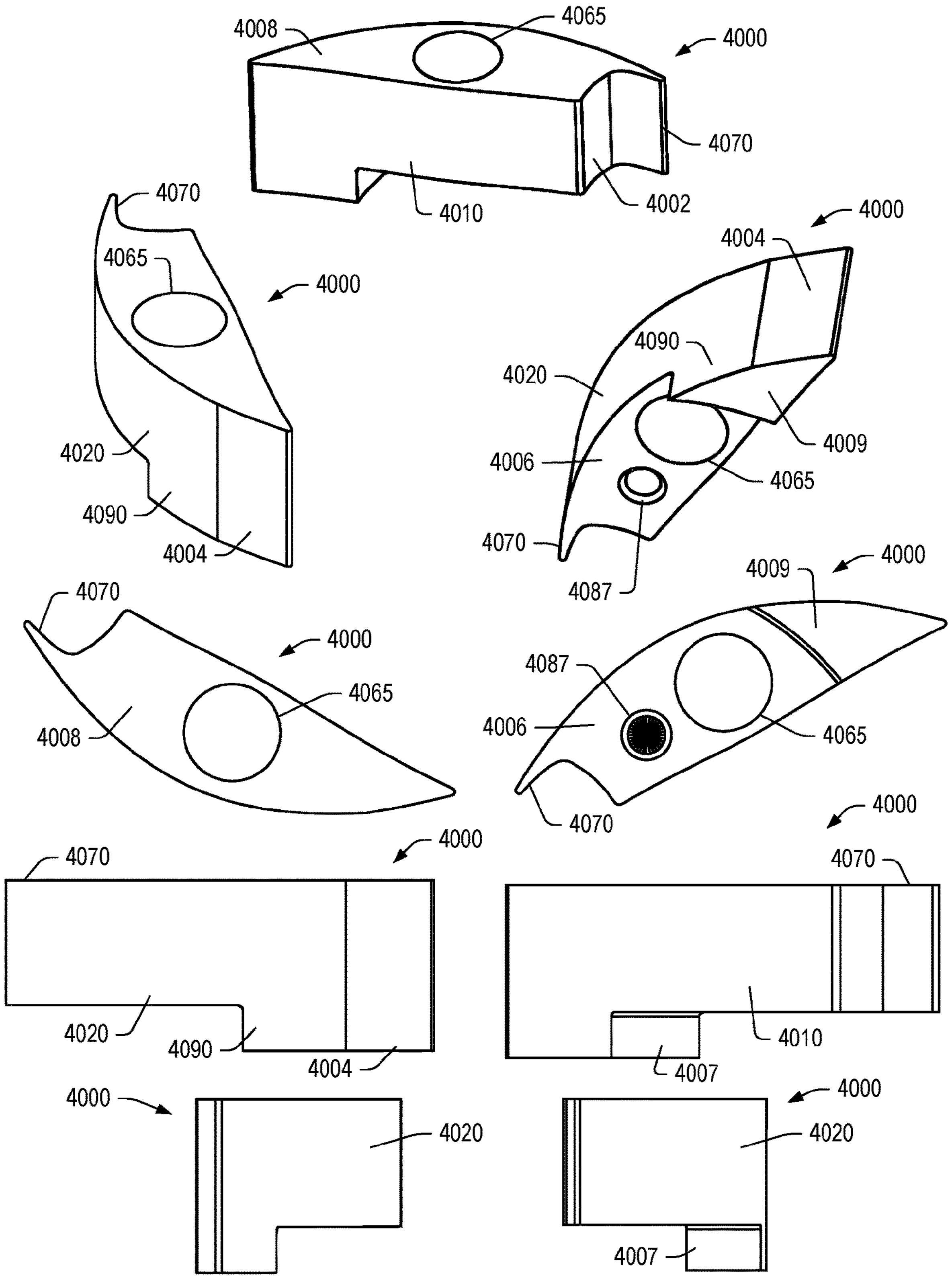
FIG. 28 shows a series of views of an example of a flow body.

FIG. 28 shows various views of an example of the flow body 4000. In several of the views, a bore 4087 is shown, along with the bore 4065. As an example, the bore 4065 may be a through bore while the bore 4087 may be a through bore or a partial bore that does not extend through the flow body 4000. As shown in FIG. 28, a surface 4007 can be a trailing surface of the spacer 4090, which can be stepped from the surface 4006. For example, the surfaces 4006, 4007 and 4009 may define a step where the surfaces 4006 and 4009 may be substantially planar and parallel with the surface 4007 defining a transition therebetween. As shown in FIG. 28, the flow body 4000 can include the spacer 4090 with a particular shape and/or size, which may be for purposes of spacing apart components and for tailoring pressure, flow, etc.

In the example of FIG. 28, the surface 4020 is shown as being curved while the surface 4010 is shown as being less curved or substantially straight. As explained, the surface 4020 may be a surface that can be positioned proximate to a surface of a tongue such that flow adjacent to the tongue continues to flow smoothly upon transition to being adjacent to the flow body 4000. As explained, the extension 4070 can be an extension of the surface 4020 and can overlap a portion of an airfoil surface of a vane such that transition of flow adjacent the extension 4070 to adjacent an exposed (non-overlapped) portion of the vane occurs relatively smoothly (e g, efficiently).

Figure 29:
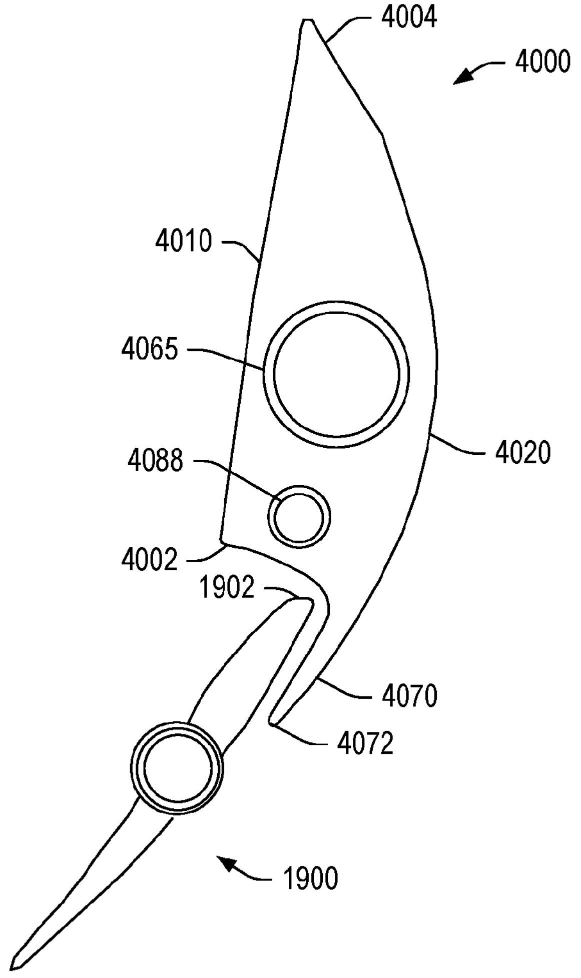
FIG. 29 shows a view of a portion of an example of an assembly.

FIG. 29 shows a portion of an example of an assembly where the vane 1900 positioned with respect to the flow body 4000. In the example of FIG. 29, the flow body 4000 includes a bore 4088 that is between the bore 4065 and the trailing surface 4002. The bore 4088 may be a through bore and extend to an opposing side of the flow body 4000 (see, e.g., the bore 4087 of FIG. 28). As an example, depending on orientation in an assembly, a flow body may have multiple bores, which may include one or more through bores and/or one or more partial bores. Such bores may provide for support, positioning, etc. In the example of FIG. 29, flow adjacent to a tongue would transition to flow adjacent to the surface 4020 of the flow body 4000, which, would then transition to flow adjacent to the vane 1900. As explained, a labyrinth type of passageway may be formed by the extension 4070 and the vane 1900 such that flow is hindered as it transitions from being along the surface 4020 to being along the vane 1900 (e.g., towards a trailing edge of the vane 1900). Such a labyrinth type of passageway may hinder flow therethrough even when the vane 1900 is not in a fully open position (e.g., where the leading edge 1902 of the vane 1900 would be closest to or in contact with the extension 4070). Again, as mentioned, in an assembly configured for contact, such contact may define a limit of rotation of more than one vane such that the most open angle of a set of vanes is defined by shape and/or positioning of a flow body.

Figure 30:
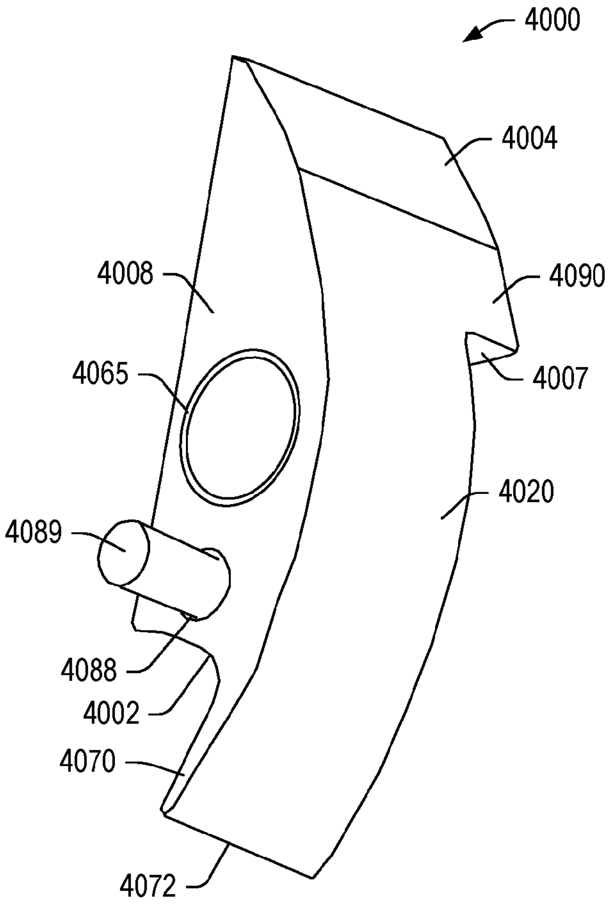
FIG. 30 shows a view of a portion of an example of an assembly.

FIG. 30 shows a portion of the example assembly in FIG. 29 where a component 4089 is received in the bore 4088. As an example, such a component may be part of a vane control assembly, a positioning assembly, etc. As an example, such a component may help to assure that the flow body 4000 is maintained in a particular position with respect to a tongue of a wall and/or one or more other components of an assembly.

Figure 31:
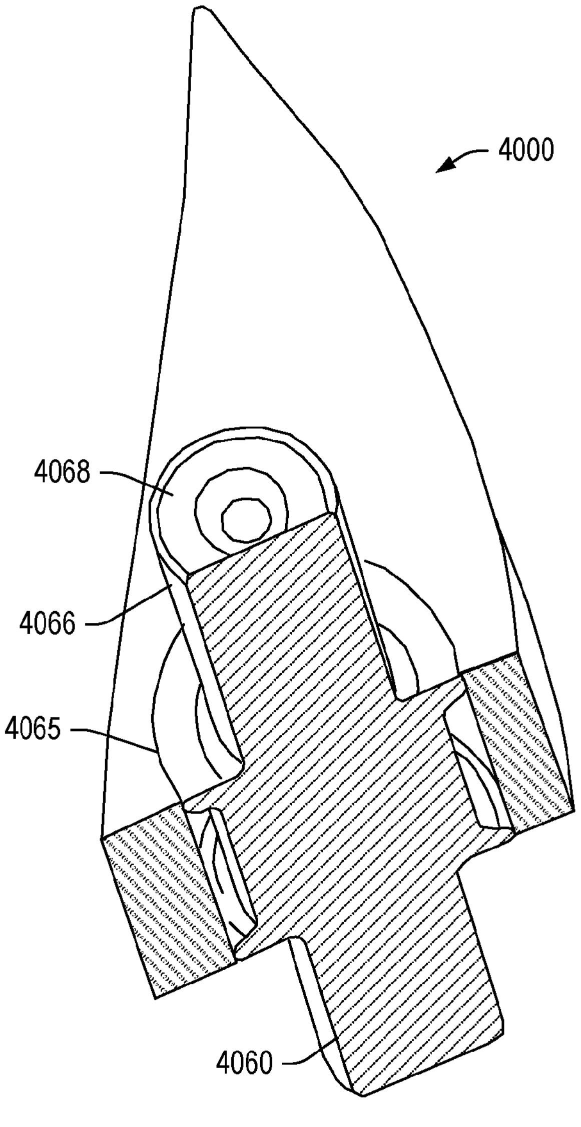
FIG. 31 shows a view of a portion of an example of a flow body.

FIG. 31 shows a cutaway view of a portion of the flow body 4000 as in FIG. 29 where a post 4060 is received in the bore 4065 of the flow body 4000. As shown, the post 4060 can include a lower portion and an upper portion 4066 that has an end 4068, which may include a connection feature (e.g., threads, etc.). As an example, the opposing end of the post 4060 may also include a connection feature. As shown, the post may include flanges that substantially align with surfaces of the flow body 4000 where internal gaps may exist between portions of the bore 4065 and portions of the post 4060.

As explained, a flow channel or throat can be defined between a vane and a flow body where the vane is adjacent to a vane that interacts with the flow body (e.g., a vane with a leading edge that can be seated within an end recess of the flow body depending on pivot angle of the vane).

Figure 32:
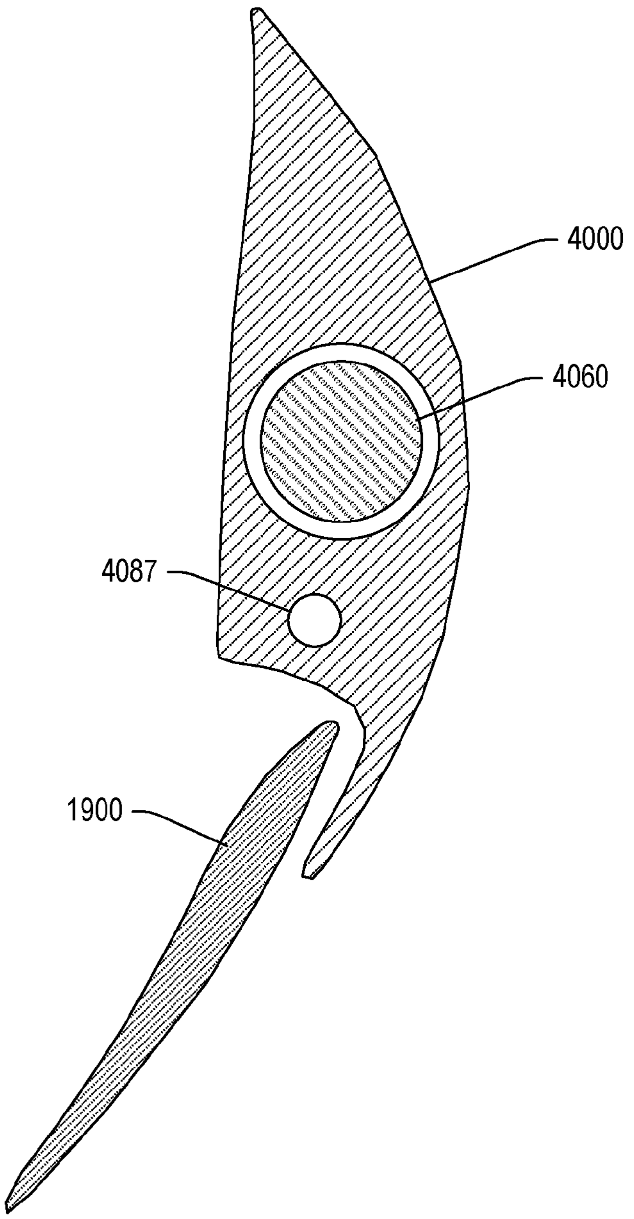
FIG. 32 shows a view of a portion of an example of an assembly.

FIG. 32 shows a cutaway view of a portion of an example assembly where the vane 1900 and the flow body 4000, along with the post 4060 are shown in cross-section. As mentioned, the flow body 4000 can include bores 4065 and 4087 or 4088 where the bore 4065 may be for mounting and positioning of the flow body 4000 and where the bore 4087 or 4088 may be for positioning of a component, which may be a control component of a vane or set of vanes.

Figure 33:
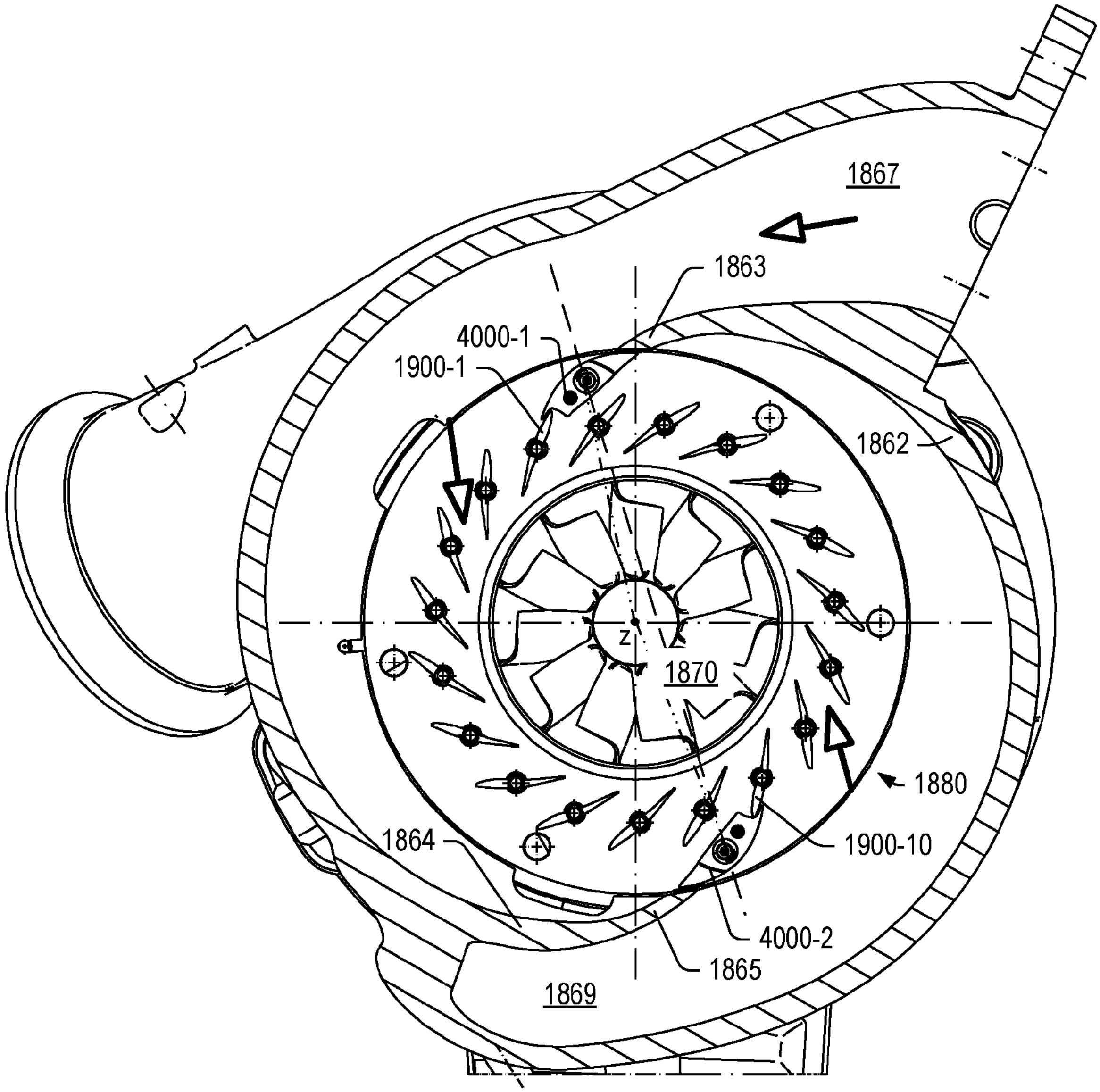
FIG. 33 shows a view of a portion of an example of an assembly.

FIG. 33 shows a cutaway view of an example of an assembly that includes vanes 1900 and two instances of the flow body 4000-1 and 4000-2 as positioned proximate to two tongues 1863 and 1865 as associated with two scrolls 1867 and 1869. Various features in FIG. 33 are described with respect to the example assembly of FIG. 9. As in the example of FIG. 9, the vanes 1900 are in an open position; however, in FIG. 33, the open position may be defined by one or both of the flow bodies 4000-1 and 4000-2. As explained, contact between a vane and an extension of a flow body may define an open position of a set of vanes that may correspond to the largest throat dimension between adjacent vanes. As an example, where vanes include two sets, each set may be adjustable independent of the other set. In such an example, one flow body may define one limit for one set and another flow body may define another limit for another set.

As mentioned, a first scroll may be associated with a first number of cylinders and a second scroll may be associated with a second number of cylinders. As an example, two scrolls may have different A/R values (see, e.g., FIG. 3). For example, the scrolls in FIG. 33 may be tailored such that A/R values differ due to one or more factors, which may be related to flow capacity of each scroll. For example, due to an exhaust gas recirculation (EGR) port upstream one scroll but not the other scroll, the one scroll may experience less flow when EGR is employed. For example, consider the cross-sectional view of FIG. 8 where a port may be positioned within an inlet portion to one of the scrolls, which may be at a portion leading to where A is defined (see, e.g., FIG. 3). As an example, with reference to FIGS. 2A and 2B, an EGR port may be provided for the conduit 217 or the conduit 219. As explained, FIG. 1 shows an example of wastegate valve 135, which may be positioned upstream a scroll. While FIG. 1 shows an example of EGR downstream a turbine housing outlet, as explained, EGR and/or other type of exhaust port may be positioned upstream, which may impact a single scroll or multiple scrolls.

Figure 34:
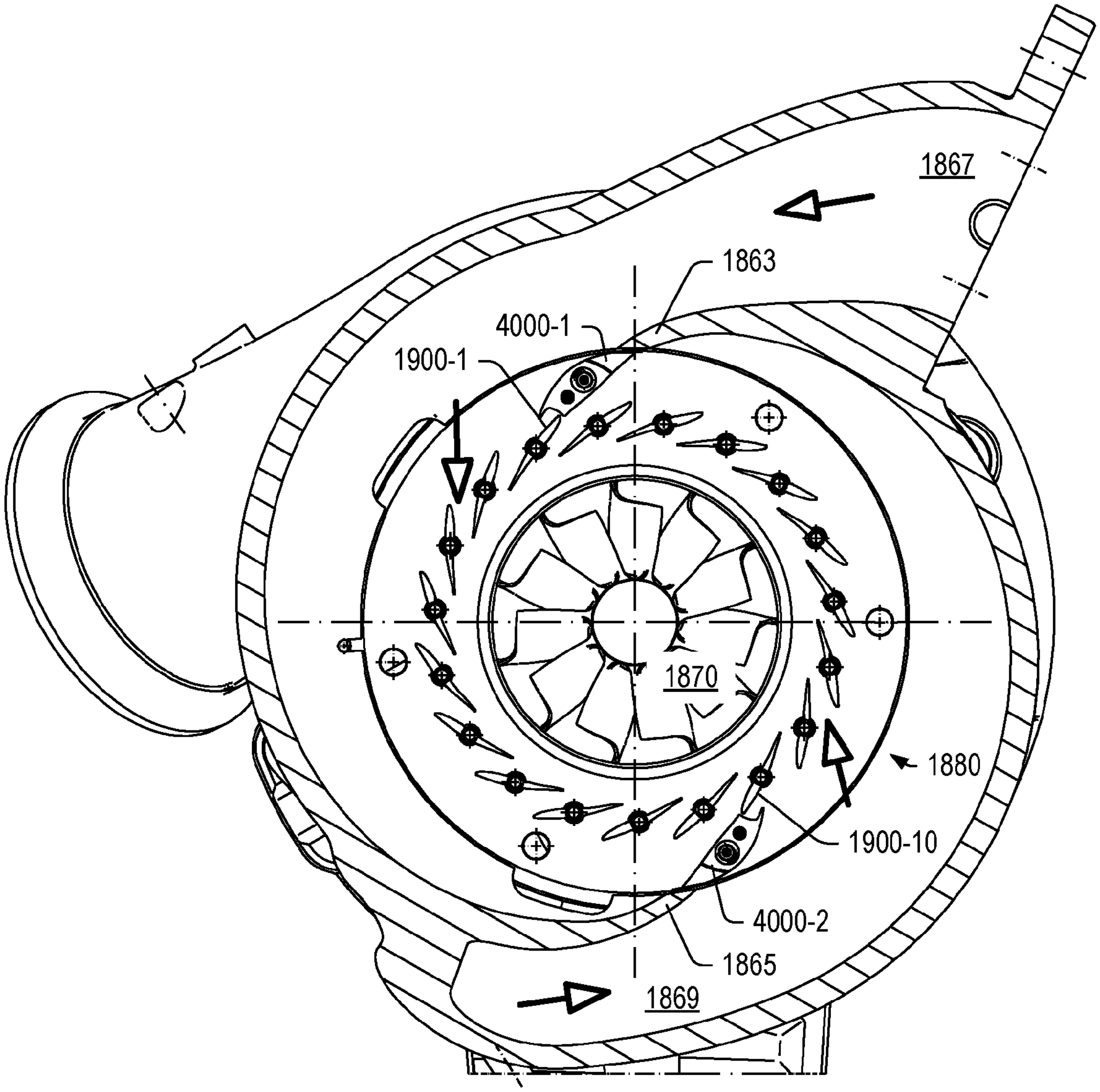
FIG. 34 shows a view of a portion of an example of an assembly.

FIG. 34 shows a cutaway view of an example of an assembly that includes the vanes 1900 and the two flow bodies 4000-1 and 4000-2 where each of the flow bodies includes an extension. In FIG. 34, the vanes 1900 are not in a fully open position and hence the throats defined between adjacent vanes have a smaller throat dimension that in the example of FIG. 33. As to a most closed position, it may be defined by contact between vanes (e.g., vane-to-vane contact) and/or by one or more other mechanisms.

As explained, in various positions of vanes, a vane can be positioned with respect to a flow body to form a labyrinth type of passage that hinders flow therethrough. As explained, an extension of a flow body can provide for one or more functions. For example, consider one or more of a limit function to limit a fully open position of vanes, a labyrinth function to hinder flow, a transition function to smooth transition from a tongue to an airflow surface of a vane (e.g., with bypass of a leading edge of the vane), a spacer function to space two or more components of an assembly, etc. As explained, other functions may be to support one or more components, for example, by receiving a peg or post in a bore, etc.

As explained, alternating aero load on variable vanes for a sector divided VNT turbine housing under partial admission operating condition can be relatively high. As an example, a sector divided VNT turbine assembly can include one or more flow bodies with an extension, which may be referred to as a "cap flap". For example, by using a cap flap on a fixed flow body at a tongue (e.g., a wall) that separates turbine nozzle sectors adjacent to a variable vane, the cap flap can moderate the aero force location distance from the swing vane pivot point hence to reduce aero torque applied on the swing vane.

As an example, part of a swing vane profile can be shielded by a cap flap (e.g., flow body) such that exhaust gas flow and pressure distribution is modified such that the aero force acting location with respect to the vane axle is shifted (e.g., compared to a fixed flow body without an extension). For example, consider shielding of a leading edge of a vane by positioning the leading edge in a pocket of a flow body. As explained, an extension of a flow body can result in vane torque load being reduced. By reducing the vane torque load, controllability can be improved for the swing vanes and wear can be reduced. In various instances, sizing of an actuator can be reduced given a reduced vane torque load.

As an example, an extension (e.g., a cap flap) of a fixed flow body can also form a type of labyrinth that can help to seal a clearance between the fixed flow body (e.g., tongue extension) and a swing vane. In such an approach, pressure separation between an active scroll and a non-active scroll can be improved; or more active scroll and less active scroll.

Utilization of an extension on a flow body can be applied to a sector divided turbine with a variable nozzle geometry (e.g., VNG or VNT), as can be used for exhaust gas pressure pulse utilization to reduce alternating aero load at partial admission and reduce phenomenon of vane arm rattle in unison ring pocket inducing risk of high wear level and potential fatigue failure at a vane axle to a vane arm joint As an example, positioning of a fixed flow body can be provided by an opening in an insert ring of a nozzle assembly (e.g., a bore, a slot, etc.). As explained, a fixed flow body may be mounted using a post or posts.

Shape modification to a fixed flow body can be provided by applying an additional aero profile contour on top of a base profile. Manufacture can include one or more of machining, casting, forging or MIM.

As explained, exhaust gas flow through a vane grid at a variable nozzle can be restricted by spacers defining a vane height channel. For example, spacers can be adjacent to swing vanes and can be affecting turbine stage efficiency and vane aero load by changing flow incidence angle at a leading edge of a vane.

As an example, an approach can use a pre-vane body (e.g., a flow body) with a defined aerodynamic profile in which a spacer can be included with a clearance and shielded from exhaust gas flow and heat transfer. Exhaust gas flow streamlines can be optimized by a specific pre-vane flow body profile to minimize negative impact on efficiency.

As an example, a flow body that includes a spacer or spacer portion can be introduced to a nozzle assembly and fixed to ring set assembly. As an example, an aerodynamic profile can be optimized via computational fluid dynamics (CFO) to avoid undesired loses and flow restriction.

As an example, a space may be shaped and sized in a manner that can reduce thermal effects. For example, consider a flow body with a spacer that can reduce high stress concentration at a fixed flow body axle radius (e.g., post radius). As an example, a flow body can be utilized to separate various functions and reduce thermal distortion load transfer to flow body. As an example, a reduction in surface contact area may be utilized to reduce heat transfer. As mentioned, a flow body can include a clearance with respect to a tongue (e.g., a divider wall, etc.). As explained, vanes can be moving components that are to be controlled using an actuator, in various instances, thermal effects can impact controllability, wear, etc. As an example, a flow body can be shaped, sized, positioned, etc., to reduce thermal effects.

As an example, an assembly can include utilizing one or more spacers at one or more locations of a nozzle assembly while providing flexibility as to dynamically loaded components, for example, with an acceptable balance between stem and rivet head. As an example, a flow body can be a tongue extension where a flow body can include a spacer portion. In such an example, the flow body may or may not include an extension at a trailing end (e.g., trailing surface). As an example, a flow body with a spacer portion can provide for separation of sectors where a flow body may be connected using a post and bore arrangement (e.g., pin and opening, etc.).

As explained, a multiple scroll arrangement may be utilized for a multi-cylinder engine where each scroll corresponds to a number of cylinders of the multi-cylinder engine. As an example, consider a six cylinder internal combustion engine with two separate exhaust manifold branches using exhaust gas recirculation (EGR) feed from one branch only, which might be providing different gas flow feeding into a turbine housing inlet. As vanes incidence angle can be same for both sectors in case of using variable diffuser vanes grid common for both volutes, flow capacity of turbine housing needs to be adjusted accordingly.

As an example, an assembly can utilize different NR for each volute design (e.g., each scroll design) and dimensioning that is targeted differently to achieve approximately equal exhaust gas velocity angle at each volute outlet even for different exhaust gas mass flow going through each volute. As an example, a multi-scroll assembly can include different scroll characteristics that can depend on factors such as, for example, EGR, which may impact exhaust flow to a scroll. As an example, a method can include performing CFD simulation, optionally considering thermal effects, to provide designs for each turbine housing scroll. In such an example, the scrolls can be of non-equal flow capacity.

A scroll is a generally spiral passage that can be defined by a housing, which may be referred to as a scroll case. A scroll can direct exhaust gas flow from a single passage such as a pipe to an annular passage, which may be referred to as an annular nozzle. For example, a scroll can direct exhaust gas from a manifold to a periphery of a turbine wheel via an annular nozzle.

A scroll may be characterized by an area over radius ratio (A/R) (see, e.g., FIG. 3). A/R is defined as the inlet (or, for compressor housings, the discharge) cross-sectional area divided by the radius from a turbine centerline to the centroid of that area. As a scroll decreases in its cross-sectional flow area as it spirals radially inwardly from its inlet to its annular nozzle, both area and radius change. NR can be selected based on various factors to help assure that, as an internal combustion engine produces exhaust gas that flows through a turbine housing, it propels a turbine wheel in an effective manner. Selection of the appropriate A/R can help to optimize performance. For example, a too small NR can bottleneck the exhaust gas and loose power, particularly in an upper region of the RPM powerband; whereas, a too large NR can make a turbine slow to react to changes in exhaust gas flow.

For a twin scroll housing, in general, NR can be defined as a sum of the inlet area of both scrolls divided by the radius at the inlet. As an example, for a twin scroll housing, NR may be defined on a per scroll basis or on an overall basis.

As explained, a method can include determining A/Ron a per scroll basis where scrolls can be of non-equal flow capacity. For example, a twin scroll assembly can include two scrolls, each with its own A/R, where the A/Rs differ and account for non-equal flow capacity of the two scrolls.

As an example, an assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first flow body disposed adjacent to the inner wall end; a second flow body disposed adjacent to the outer wall end; and at least one set of adjustable variable geometry nozzle vanes that define nozzle throats that direct flow of exhaust gas from at least one of the exhaust gas channels to the turbine wheel space, where at least one of the first flow body and the second flow body includes a concave trailing surface that is defined in part by an arc of a circle. In such an example, the first flow body and the second flow body can be fixed.

As an example, an inner wall end can form a first tongue where a first flow body is adjacent to the first tongue and an outer wall end can form a second tongue where the second flow body is adjacent to the second tongue.

As an example, a circle can be centered on a pivot axis of one of a plurality of vanes (e.g., a set of vanes) where a flow body includes a concave trailing surface that is defined in part by an arc of a circle. For example, a leading edge of a vane can define an arc as the vane is pivoted (e.g., rotated) about a pivot axis (e.g., of a post, a bore, etc.). In such an example, the trailing surface can be defined using the arc (e.g. a radius of the circle) plus a clearance distance (e.g., a radial clearance distance) such that the vane can pivot about its pivot axis without the leading edge undesirably contacting the trailing surface of the flow body. In such an example, overlap can occur between the trailing surface of the flow body and the leading edge of the vane for a number of degrees of pivoting of the vane about its pivot axis. In such an example, an overlap clearance between the leading edge of the vane and the trailing surface of the flow body may be sufficiently small to hinder exhaust gas flow from one exhaust gas passage to another exhaust gas passage.

As an example, a circle can be defined by a radius that is greater than a radius swept by a leading edge of one of the adjustable variable geometry nozzle vanes in transitioning from a closed position to an open position (e.g., consider greater than by a distance that defines a clearance, etc.).

As an example, a first flow body can include a leading surface, a trailing surface, and a first airfoil surface and a second airfoil surface that extend between the leading surface and the trailing surface. In such an example, the leading surface may be positioned proximate to a wall end, for example, with a small clearance that may accommodate thermal effects, vibration, etc. (e.g., in a manner to avoid contact with the wall end yet hinder exhaust flow between the leading surface and the wall end. As an example, a trailing surface can include a first airfoil surface end adjacent to a first airfoil surface and a second airfoil surface end adjacent to a second airfoil surface. In such an example, the first airfoil surface end and the second airfoil surface end can define an overlap pivot angle range for a leading edge of a respective one of a plurality of adjustable variable geometry nozzle vanes. In such an example, the overlap pivot angle range can be less than a total pivot angle range of the leading edge of the respective one of the adjustable variable geometry nozzle vanes. In such an example, an overlap pivot angle range can be greater than 50 percent of the total pivot angle range and less than 80 percent of the total pivot angle range. As an example, an overlap pivot angle range can be offset toward a closed position of a total pivot angle range.

As an example, a second airflow surface end can include a chamfer that defines a bypass clearance with respect to a leading edge of a corresponding one of a plurality of adjustable variable geometry nozzle vanes. In such an example, a first airflow surface end can define a clearance with respect to the leading edge of the corresponding one of the adjustable variable geometry nozzle vanes, where the bypass clearance is greater than the clearance. As an example, a bypass clearance can be provided to reduce pulsation pressure stress on an actuator for at least one set of adjustable variable geometry nozzle vanes As an example, a first flow body and a second flow body can include respective heights that are approximately equal to a vane height.

As an example, a number of adjustable variable geometry nozzle vanes of an assembly can be greater than 5. As an example, a number of adjustable variable geometry nozzle vanes can be an odd number (e.g., or an even number).

As an example, an assembly can include an exhaust gas turbine housing that includes an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first flow body disposed adjacent to the inner wall end; a second flow body disposed adjacent to the outer wall end; and at least one set of adjustable variable geometry nozzle vanes that define nozzle throats that direct flow of exhaust gas from at least one of the exhaust gas channels to the turbine wheel space.

In such an example, the first flow body and the second flow body can be fixed (i.e., not movable during operation). As an example, the first flow body and/or the second flow body may be movable responsive to a pressure that exceeds a predetermined pressure (e.g., as may be caused by significant pulsation to thereby relieve stress on the vanes and/or an actuator).

As an example, the inner wall end can form a first tongue and the first flow body can be adjacent to the first tongue and the outer wall end can form a second tongue and the second flow body can be adjacent to the second tongue.

As an example, the first flow body and/or the second flow body can include a trailing edge that is defined in part by an arc of a circle. In such an example, the circle can be centered on a pivot axis of one of the vanes. In such an example, the trailing edge can include a chamfer adjacent to the arc where the chamfer defines a gap with respect to a leading edge of the one of the vanes. In such an example, the arc can define a clearance with respect to the leading edge of the one of the vanes. In such an example, the clearance can be less than approximately 70 percent of the gap. In such an example, the gap can reduce pulsation pressure stress on an actuator for the at least one set of adjustable variable geometry nozzle vanes.

As an example, a gap can be within an operational range of the one of the vanes that is between a midway point of an open position and a closed position and the closed position.

As an example, a first flow body and/or a second flow body can include a height approximately equal to a vane height.

As an example, a first flow body and/or a second flow body can be defined with respect to another component using one or more continuities.

As an example, the number of vanes may be greater than approximately 5 and can be an odd number or an even number.

An assembly can include an exhaust gas turbine housing including an inner wall and an outer wall that define a first exhaust gas channel and a second exhaust gas channel to a turbine wheel space where the inner wall includes an inner wall end at the turbine wheel space and the outer wall includes an outer wall end at the turbine wheel space; a first flow body disposed adjacent to the inner wall end; a second flow body disposed adjacent to the outer wall end; and at least one set of adjustable variable geometry nozzle vanes that define nozzle throats that direct flow of exhaust gas from at least one of the exhaust gas channels to the turbine wheel space, where at least one of the first flow body and the second flow body includes a concave trailing surface that is defined in part by an extension of an airfoil surface.

As an example, a first flow body and a second flow body can be fixed. As an example, an inner wall end can form a first tongue where a first flow body is adjacent to the first tongue. As an example, an outer wall end can form a second tongue where the second flow body is adjacent to the second tongue.

As an example, an extension can defines a pocket that receives a leading edge of one of the adjustable variable geometry nozzle vanes.

As an example, an extension can limit rotation of one of adjustable variable geometry nozzle vanes in one of two rotational directions.

As an example, at least one of a first flow body and a second flow body can include a spacer. In such an example, the spacer can be disposed at a leading surface of the at least one of the first flow body and the second flow body. As an example, a spacer can be disposed at a leading surface of the at least one of the first flow body and the second flow body without extending to a post of the at least one of the first flow body and the second flow body.

As an example, a first flow body can include a leading surface, a concave trailing surface, and a first airfoil surface and a second airfoil surface that extend between the leading surface and the concave trailing surface where, for example, one of the first airfoil surface and the second airfoil surface is formed in part by an extension. In such an example, the one of the first airfoil surface and the second airfoil surface can include a varying height. For example, a varying height can include a lesser height at the extension.

As an example, an extension can include a height approximately equal to a vane height, which may or may not be constant along a length of the extension. As an example, a maximum flow body height may exceed a vane height. For example, consider a flow body that includes a spacer (e.g., a spacer portion) that exceeds a vane height.

As an example, a first exhaust gas channel and a second exhaust gas channel can have different AIR values. For example, A/R values can differ due to an exhaust gas recirculation port associated with a conduit to one of the first exhaust gas channel and the second exhaust gas channel. As an example, different A/R values can account for non-equal exhaust flow capacity to the first exhaust gas channel and the second exhaust gas channel.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:

an exhaust gas turbine housing comprising an inner wall and an outer wall that define a first exhaust gas channel and a second exhaust gas channel to a turbine wheel space, wherein the inner wall comprises an inner wall end at the turbine wheel space and the outer wall comprises an outer wall end at the turbine wheel space;

a first flow body arranged adjacent to the inner wall end;

a second flow body arranged adjacent to the outer wall end; and at least one set of adjustable variable geometry nozzle vanes that define nozzle throats that direct flow of exhaust gas from at least one of the exhaust gas channels to the turbine wheel space;

wherein at least one of the first flow body and the second flow body comprises a concave trailing surface that is defined in part by an extension of an airfoil surface;

wherein the first flow body comprises a leading surface, the concave trailing surface, and a first airfoil surface and a second airfoil surface that extend between the leading surface and the concave trailing surface;

wherein one of the first airfoil surface and the second airfoil surface is formed in part by the extension; and wherein the one of the first airfoil surface and the second airfoil surface comprises a varying height, and wherein the varying height comprises a lesser height at the extension.

2. The assembly of claim 1, wherein the first flow body and the second flow body are fixed.

3. The assembly of claim 1, wherein the inner wall end forms a first tongue and wherein the first flow body is adjacent to the first tongue.

4. The assembly of claim 1, wherein the outer wall end forms a second tongue and wherein the second flow body is adjacent to the second tongue.

5. The assembly of claim 1, wherein the extension defines a pocket that receives a leading edge of one of the adjustable variable geometry nozzle vanes.

6. The assembly of claim 1, wherein the extension limits rotation of one of the adjustable variable geometry nozzle vanes in one of two rotational directions.

7. The assembly of claim 1, wherein at least one of the first flow body and the second flow body comprises a spacer.

8. The assembly of claim 7, wherein the spacer is disposed at a leading surface of the at least one of the first flow body and the second flow body.

9. The assembly of claim 7, wherein the spacer is disposed at a leading surface of the at least one of the first flow body and the second flow body and does not extend to a post of the at least one of the first flow body and the second flow body.

10. The assembly of claim 1, wherein the extension comprises a height approximately equal to a vane height.

11. The assembly of claim 10, wherein a maximum flow body height exceeds a vane height.

12. The assembly of claim 1, wherein the first exhaust gas channel and the second exhaust gas channel comprise different A/R values.

* * * * *